US012701316B2

(12) United States Patent
Tang et al.

(10) Patent No.: US 12,701,316 B2
(45) Date of Patent: Aug. 4, 2026

(54) METHOD FOR DISPLAYING PREVIEW IMAGE IN ZOOM SHOOTING SCENE AND ELECTRONIC DEVICE

(71) Applicant: Huawei Technologies Co., Ltd., Shenzhen (CN)

(72) Inventors: Jinhua Tang, Shenzhen (CN); Yanming Zhu, Shanghai (CN); Yayun Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 18/557,205

(22) PCT Filed: Apr. 21, 2022

(86) PCT No.: PCT/CN2022/088235
§ 371 (c)(1),
(2) Date: Oct. 25, 2023

(87) PCT Pub. No.: WO2022/228274
PCT Pub. Date: Nov. 3, 2022

(65) Prior Publication Data
US 2024/0244311 A1 Jul. 18, 2024

(30) Foreign Application Priority Data
Apr. 27, 2021 (CN) .......................... 202110460565.8

(51) Int. Cl.
*H04N 23/61* (2023.01)
*H04N 23/63* (2023.01)
*H04N 23/667* (2023.01)
*H04N 23/69* (2023.01)

(52) U.S. Cl.
CPC ........... *H04N 23/61* (2023.01); *H04N 23/631* (2023.01); *H04N 23/633* (2023.01); *H04N 23/667* (2023.01); *H04N 23/69* (2023.01)

(58) Field of Classification Search
CPC .... H04N 23/61; H04N 23/631; H04N 23/632; H04N 23/633; H04N 23/635; H04N 23/667; H04N 23/69; H04N 23/695
See application file for complete search history.

(56) References Cited

U.S. PATENT DOCUMENTS

| | | | | |
|---|---|---|---|---|
| 10,341,529 B2* | 7/2019 | Cho | ........................ | H04N 23/62 |
| 2010/0173678 A1* | 7/2010 | Kim | ........................ | H04N 23/61 |
| | | | | 348/E5.022 |
| 2018/0069983 A1* | 3/2018 | Cho | ....................... | H04N 23/632 |
| 2020/0019213 A1* | 1/2020 | Lee | ........................ | H04N 7/188 |

(Continued)

FOREIGN PATENT DOCUMENTS

| | | | | |
|---|---|---|---|---|
| CN | 110460773 A | * 11/2019 | ............. | H04N 23/62 |
| CN | 111010506 A | 4/2020 | | |
| CN | 112333380 A | 2/2021 | | |

*Primary Examiner* — Antoinette T Spinks
(74) *Attorney, Agent, or Firm* — Conley Rose, P.C.

(57) ABSTRACT

A method for displaying a preview image in a zoom shooting scene includes starting a camera application in an electronic device, where a camera on the electronic device acquires a first image; identifying, in a zoom shooting mode, a target shooting object on the first image; and displaying a first preview image, where the first preview image is a preview image corresponding to at least one target shooting object on the first image.

20 Claims, 22 Drawing Sheets

(56)           References Cited

U.S. PATENT DOCUMENTS

| 2020/0257436 A1* | 8/2020 | Yun | H04M 1/725 |
| 2021/0168300 A1* | 6/2021 | Wang | H04N 23/698 |
| 2025/0088731 A1* | 3/2025 | Wasu | H04N 23/69 |
| 2025/0141989 A1* | 5/2025 | Lee | H04M 1/72469 |

* cited by examiner

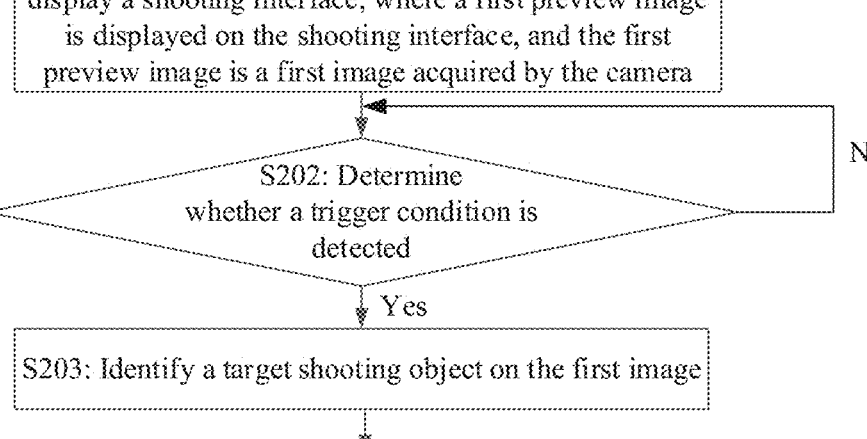

S201: Start a camera application to turn on a camera, and display a shooting interface, where a first preview image is displayed on the shooting interface, and the first preview image is a first image acquired by the camera S202: Determine whether a trigger condition is detected No Yes S203: Identify a target shooting object on the first image S204: Display a second preview image on the shooting interface, where the second preview image is an image block in a first region on the first image, and the first region is a region in which at least one target shooting object is located

FIG. 2

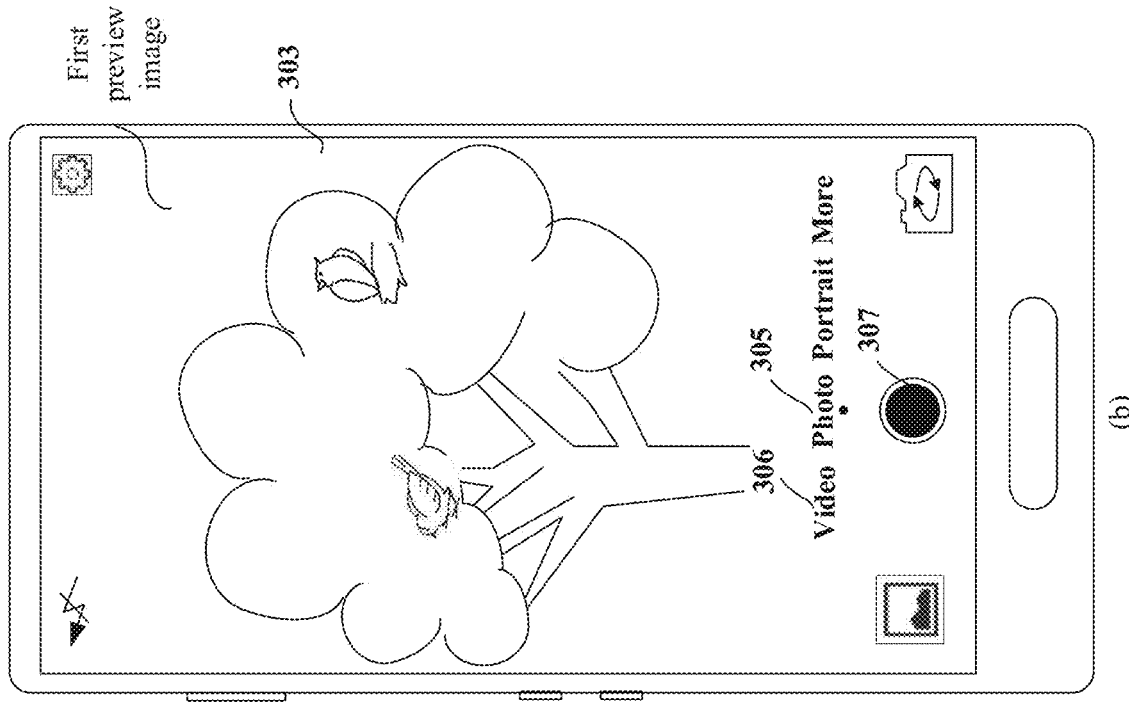
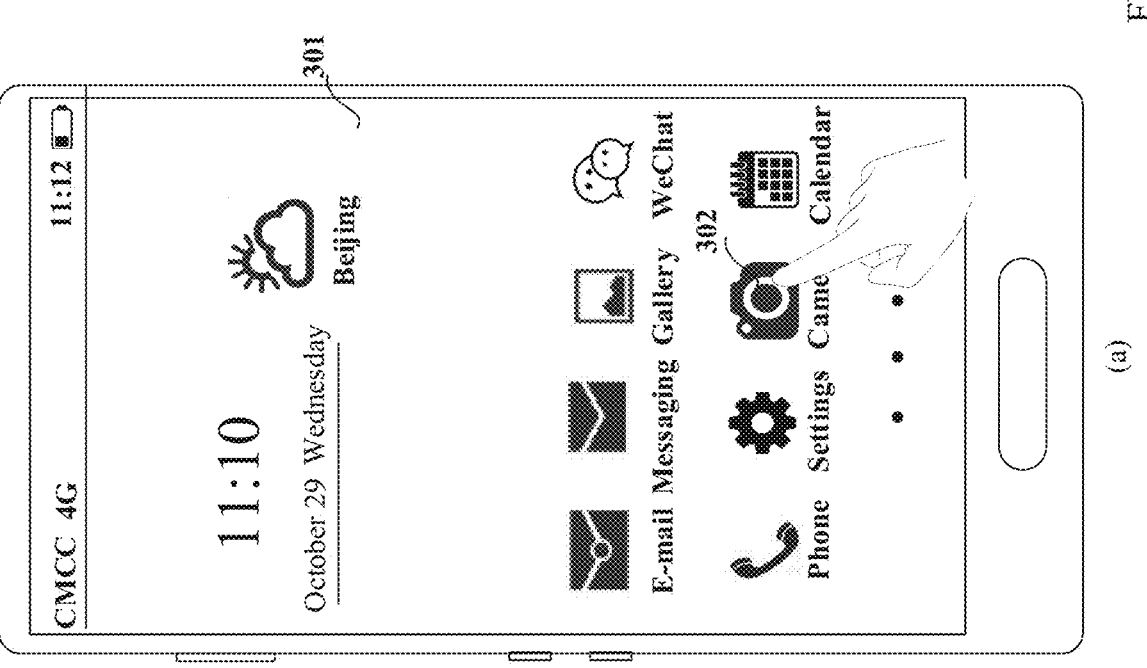
FIG. 3

First
preview
image

Second preview image

Video  Photo  Portrait  More
(a)

Video  Photo  Portrait  More
(b)

Video  Photo  Portrait  More
(c)

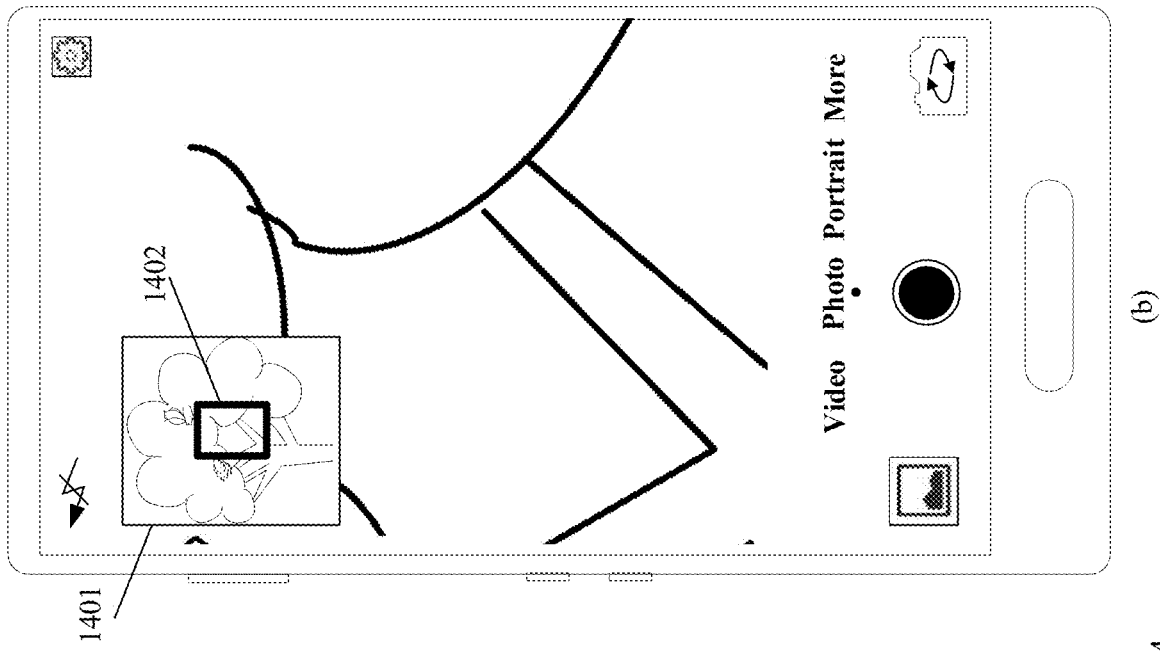
(b)
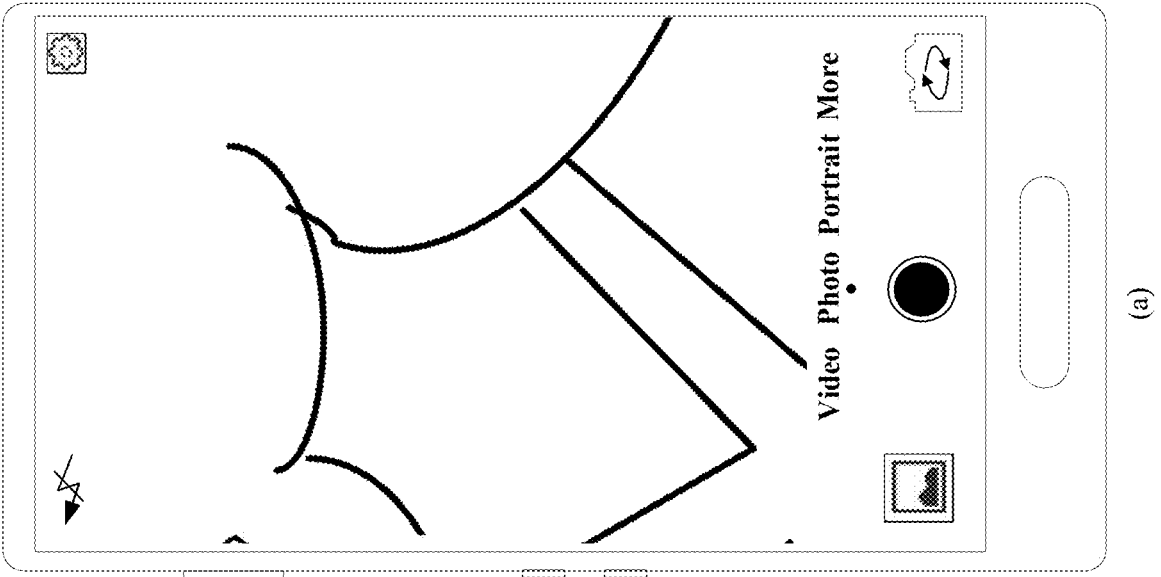
(a)
FIG. 14

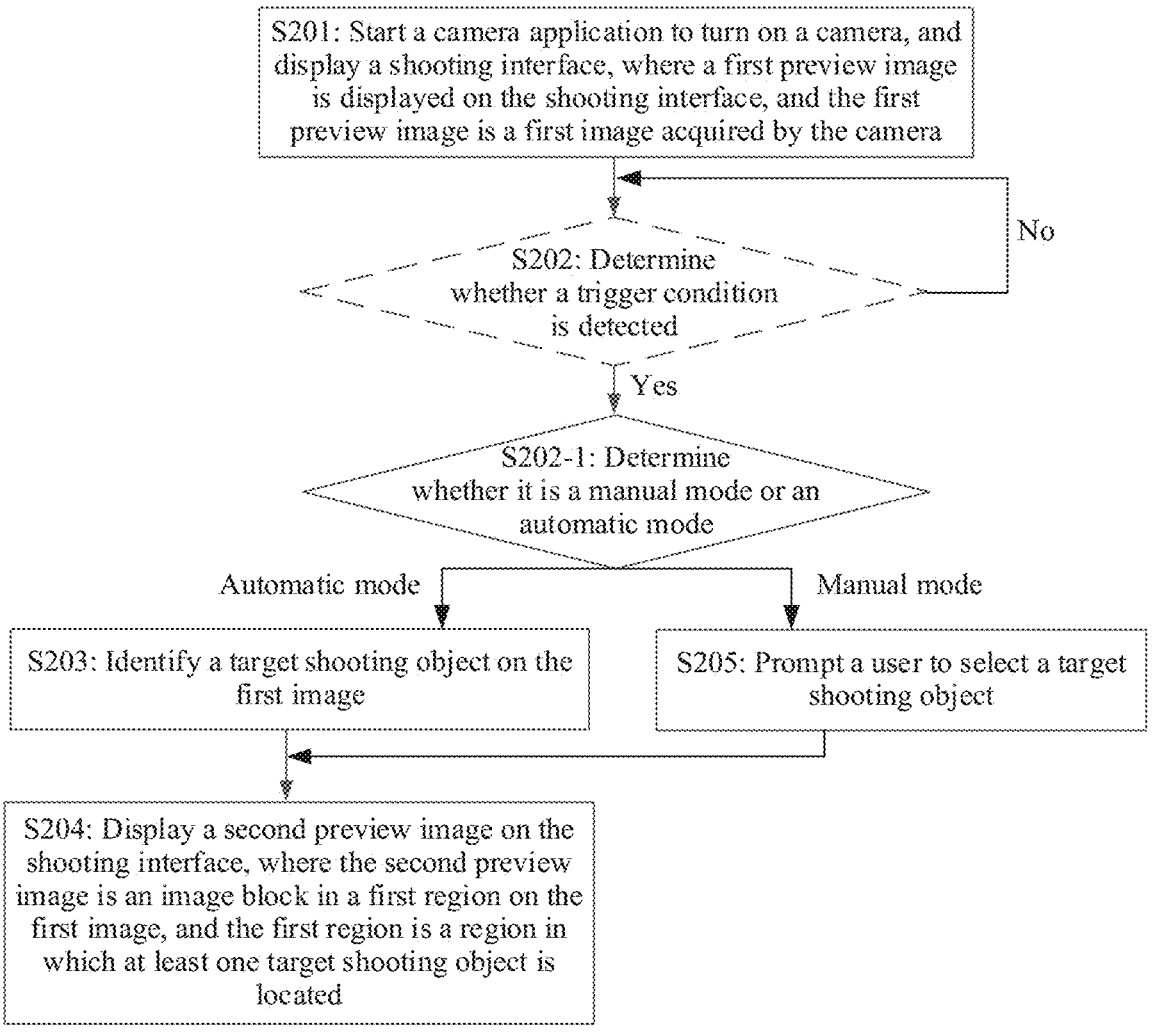

S201: Start a camera application to turn on a camera, and display a shooting interface, where a first preview image is displayed on the shooting interface, and the first preview image is a first image acquired by the camera S202: Determine whether a trigger condition is detected No Yes S202-1: Determine whether it is a manual mode or an automatic mode Automatic mode Manual mode S203: Identify a target shooting object on the first image S205: Prompt a user to select a target shooting object S204: Display a second preview image on the shooting interface, where the second preview image is an image block in a first region on the first image, and the first region is a region in which at least one target shooting object is located

Start a camera application in an electronic device, where a camera on the electronic device acquires a first image

S1902

Identify, in a zoom shooting mode, a target shooting object on the first image

S1903

Display a first preview image, where the first preview image is a preview image corresponding to at least one target shooting object on the first image

S1904

Display a first window while displaying the first preview image, where the first window displays the first image and a first marker, and the first marker is used to mark the at least one target shooting object on the first image

FIG. 19

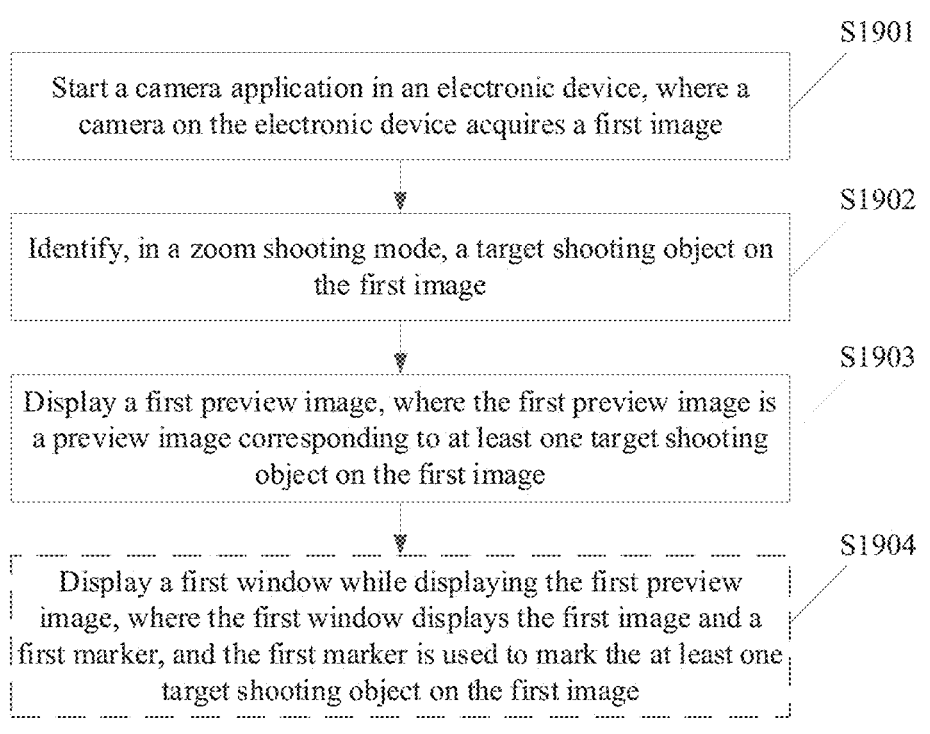

2003

Communication interface

Electronic device 2000

2005

2001

Processor

2002

Memory

Computer program

METHOD FOR DISPLAYING PREVIEW IMAGE IN ZOOM SHOOTING SCENE AND ELECTRONIC DEVICE

CROSS-REFERENCE TO RELATED APPLICATION

This is a National Stage of International Patent Application No. PCT/CN2022/088235 filed on Apr. 21, 2022, which claims priority to Chinese Patent Application No. 202110460565.8 filed on Apr. 27, 2021. Both of the aforementioned applications are hereby incorporated by reference in their entireties.

TECHNICAL FIELD

This application relates to the field of electronic technologies, and in particular, to a method for displaying a preview image in a zoom shooting scene and an electronic device.

BACKGROUND

Zoom shooting enables an electronic device to shoot an image of a distant object. A mobile phone is used as an example. When a zoom ratio is increased, a to-be-shot object on a shooting interface is "zoomed in". This zoom shooting provides great convenience for a user who likes to shoot an image of a distant view.

However, in a current zoom shooting manner, when a zoom ratio is increased, an object in a central region of an image is zoomed in. However, the object in the central region may not be an object that the user wants to shoot an image of. In this case, the user needs to move the mobile phone to search for an object that the user wants to shoot an image of. An entire searching process is time-consuming and labor-consuming. In addition, once the mobile phone moves at a relatively high speed, it is likely to miss a target object, resulting in inconvenience and poor experience.

SUMMARY

An objective of this application is to provide a method for displaying a preview image in a zoom shooting scene and an electronic device, to improve experience of shooting a distant object.

According to a first aspect, a method for displaying a preview image in a zoom shooting scene is provided. The method may be applied to an electronic device, for example, a mobile phone or a tablet computer. The method includes: starting a camera application in the electronic device, where a camera on the electronic device acquires a first image: identifying, in a zoom shooting mode, a target shooting object on the first image: and displaying a first preview image. The first preview image is a preview image corresponding to at least one target shooting object on the first image.

It should be noted that, generally, in a zoom shooting mode, the displayed preview image is a preview image corresponding to an image block in a central region on the first image. If there is no object that the user wants to shoot an image of in the central region, the user needs to move a location of the electronic device to search for the shooting object. However, in the method for displaying a preview image in a zoom scene provided in this application, in a zoom shooting mode, the first preview image is a preview image corresponding to at least one target shooting object on the first image. For example, if the at least one target shooting object is a person, the first preview image is a preview image corresponding to the person. If the at least one target shooting object is an animal, the first preview image is a preview image corresponding to the animal. Compared with the foregoing zoom shooting mode, moving the location of the electronic device to search for the target shooting object is not required, and an operation is convenient.

In a possible design, a size of the at least one target shooting object on the first preview image is greater than a size of the at least one target shooting object on the first image.

For example, it is assumed that the first image acquired by the camera is zoomed in by one time, and the first preview image may be zoomed in by 15 times. 20 times, 25 times, or the like. In conclusion, the first preview image is a preview image corresponding to the first image that is zoomed in, and the at least one target shooting object on the first image is zoomed in.

In a possible design, the method further includes: displaying a first window while displaying the first preview image. The first window displays the first image and a first marker, and the first marker is used to mark the at least one target shooting object on the first image. In other words, the user may determine, by using the first marker in the first window; a specific target shooting object in the first image that corresponds to a current preview image (that is, the first preview image), and user experience is relatively good.

In a possible design, the method further includes: displaying a second marker in the first window. The second marker is used to mark another target shooting object other than the at least one target shooting object on the first image, and the first marker is different from the second marker. In other words, the user may not only determine target shooting objects on the first image by using the first window, but also determine a target shooting object on the first image corresponding to the current preview image (for example, the first preview image), thereby improving user experience.

In a possible design, the first image includes a first target shooting object and a second target shooting object, and the first preview image is a preview image corresponding to the first target shooting object: and a second preview image is displayed when a switching operation of the target shooting object is detected. The second preview image is a preview image corresponding to the second target shooting object. A size of the second target shooting object on the second preview image is greater than a size of the second target shooting object on the first image.

In other words, when an image of the first target shooting object is originally zoomed in and shot, an image of the second target shooting object is zoomed in and shot by using the switching operation of the target shooting object, so that the user does not need to move the electronic device to search for the target shooting object, and an operation is convenient.

In a possible design, the method further includes: displaying a first window while displaying the second preview image. The first window displays the first image and a second marker, and the second marker is used to mark the second target shooting object on the first image. When the first window displays the second marker, display of a first marker in the first window is canceled or the second marker is displayed differently from the first marker. The first marker is used to mark the first target shooting object on the first image. In other words, when the image of the first target shooting object is originally zoomed in and shot, the first window displays the first marker to mark the first target shooting object. When the image of the second target shooting object is zoomed in and shot by using the target shooting object switching operation, the first window displays the second marker to mark the second target shooting object. In addition, display of the first marker is canceled or the first marker and the second marker are displayed differently. In this way: it is more convenient for the user to distinguish a target shooting object on the first image corresponding to the current preview image (for example, the second preview image).

In a possible design, the first image includes the first target shooting object and the second target shooting object, and the first preview image is the preview image corresponding to the first target shooting object. A third preview image is displayed when an operation for adding a target shooting object to a preview image is detected. The third preview image is a preview image corresponding to the first target shooting object and the second target shooting object. Sizes of the first target shooting object and the second target shooting object on the third preview image are greater than sizes of the first target shooting object and the second target shooting object on the first image.

In other words, when an image of the first target shooting object is originally zoomed in and shot, an operation for increasing the quantity of target shooting objects in the preview image is performed, so that images of the first target shooting object and the second target shooting object are zoomed in and shot. The user does not need to move the electronic device to search for the first target shooting object and the second target shooting object, and an operation is convenient.

In a possible design, the first image includes the first target shooting object and the second target shooting object, and the first preview image is the preview image corresponding to the first target shooting object. When an operation for increasing a quantity of target shooting objects in a preview image is detected, the first preview image is displayed in a first region on a display of the electronic device, and a fourth preview image is displayed in a second region, where the fourth preview image is a preview image corresponding to the second target shooting object. A size of the second target shooting object on the fourth preview image is greater than the size of the second target shooting object on the first image.

In other words, when an image of the first target shooting object is zoomed in and shot, an operation for increasing the quantity of target shooting objects on the shooting interface is performed, so that images of the first target shooting object and the second target shooting object are zoomed in and shot, and the first target shooting object and the second target shooting object are displayed on split screens. The user does not need to move the electronic device to search for the first target shooting object and the second target shooting object, and an operation is convenient.

In a possible design, the method further includes: displaying a fifth preview image when a target shooting object on the first image is not identified. The fifth preview image is a preview image corresponding to an image block in a central region on the first image. In other words, if the target shooting object is not identified, an image of the object in the central region on the first image is zoomed in and shot.

In a possible design, the method further includes: detecting a shooting instruction; and shooting the first image and a second image in response to the shooting instruction. The second image is a shot image corresponding to the first preview image. In other words, during zoom shooting, if a shooting button is tapped, a complete image (that is, the first image) is shot, and a magnified image (that is, the second image) of at least one target shooting object is further shot. This facilitates comparison by the user, and experience is relatively good.

In a possible design, the at least one target shooting object may be a shooting object that occupies a largest or smallest region on the first image: or the at least one target shooting object may be a shooting object close to a central region or an edge region in the first image, or the at least one target shooting object may be a shooting object that is in the first image and that the user is interested in; or the at least one target shooting object may be a target shooting object specified by the user.

The foregoing describes examples of several manners of determining the at least one target shooting object. This embodiment of this application is not limited to the foregoing manners, and the at least one target shooting object may be determined in another manner.

In a possible design, the method further includes: hiding the first window when a window hiding operation is detected: and displaying the first window when a window call-out operation is detected. In other words, the first window may be invoked or may be hidden. For example, when the user wants to view a target shooting object in the first image corresponding to the current preview image (for example, the first preview image), the first window may be invoked. When the user does not want the first window to block the first preview image, the user may hide the first window.

According to a second aspect, an electronic device is provided, including.

a processor, a memory, and one or more programs.

The one or more computer programs are stored in the memory, the one or more computer programs include instructions, and when the instructions are executed by the processor, the electronic device is enabled to perform the following steps:

starting a camera application in the electronic device, where a camera on the electronic device acquires a first image;

identifying, in a zoom shooting mode, a target shooting object on the first image: and displaying a first preview image, where the first preview image is a preview image corresponding to at least one target shooting object on the first image.

In a possible design, a size of the at least one target shooting object on the first preview image is greater than a size of the at least one target shooting object on the first image.

In a possible design, when the instructions are executed by the processor, the electronic device is enabled to perform the following step: displaying a first window while displaying the first preview image. The first window displays the first image and a first marker, and the first marker is used to mark the at least one target shooting object on the first image.

In a possible design, the first image includes a first target shooting object and a second target shooting object, and the first preview image is a preview image corresponding to the first target shooting object. When the instructions are executed by the processor, the electronic device is enabled to perform the following step:

displaying a second preview image when a target shooting object switching operation is detected, where the second preview image is a preview image corresponding to the second target shooting object.

In a possible design, a size of the second target shooting object on the second preview image is greater than a size of the second target shooting object on the first image.

In a possible design, when the instructions are executed by the processor, the electronic device is enabled to perform the following step:

displaying a first window while displaying the second preview image, where the first window displays the first image and a second marker, and the second marker is used to mark the second target shooting object on the first image.

When the first window displays the second marker, display of a first marker in the first window is canceled. The first marker is used to mark the first target shooting object on the first image.

In a possible design, the first image includes a first target shooting object and a second target shooting object, and the first preview image is a preview image corresponding to the first target shooting object. When the instructions are executed by the processor, the electronic device is enabled to perform the following step:

displaying a third preview image when an operation for adding a target shooting object to a preview image is detected, where the third preview image is a preview image corresponding to the first target shooting object and the second target shooting object.

Sizes of the first target shooting object and the second target shooting object on the third preview image are greater than sizes of the first target shooting object and the second target shooting object on the first image.

In a possible design, the first image includes a first target shooting object and a second target shooting object, and the first preview image is a preview image corresponding to the first target shooting object. When the instructions are executed by the processor, the electronic device is enabled to perform the following steps:

when an operation for increasing a quantity of target shooting objects in a preview image is detected, displaying the first preview image in a first region on a display of the electronic device, and displaying a fourth preview image in a second region, where the fourth preview image is a preview image corresponding to the second target shooting object.

A size of the second target shooting object on the fourth preview image is greater than the size of the second target shooting object on the first image.

In a possible design, when the instructions are executed by the processor, the electronic device is enabled to perform the following step: displaying a fifth preview image when a target shooting object on the first image is not identified. The fifth preview image is a preview image corresponding to an image block in a central region on the first image.

In a possible design, when the instructions are executed by the processor, the electronic device is enabled to perform the following steps: detecting a shooting instruction: and shooting the first image and a second image in response to the shooting instruction. The second image is a shot image corresponding to the first preview image.

In a possible design, when the instructions are executed by the processor, the electronic device is enabled to perform the following steps: hiding the first window when a window hiding operation is detected; and displaying the first window when a window call-out operation is detected.

According to a third aspect, a computer-readable storage medium is further provided. The computer-readable storage medium is configured to store a computer program. When the computer program is run on a computer, the computer is enabled to perform the method according to the first aspect.

According to a fourth aspect, a computer program product is further provided, including a computer program. When the computer program is run on a computer, the computer is enabled to perform the method according to the first aspect.

According to a fifth aspect, a graphical user interface on an electronic device is further provided. The electronic device has a display, a memory, and a processor. The processor is configured to execute one or more computer programs stored in the memory, and the graphical user interface includes a graphical user interface displayed when the electronic device performs the method according to the first aspect.

According to a sixth aspect, an embodiment of this application further provides a chip. The chip is coupled to a memory in an electronic device, and is configured to invoke a computer program stored in the memory and execute a technical solution according to the first aspect. In this embodiment of this application, "coupling" means a direct combination or an indirect combination of two components.

For beneficial effects of the second aspect to the sixth aspect, refer to the beneficial effects of the first aspect. Details are not described again.

BRIEF DESCRIPTION OF DRAWINGS

FIG. 2 is a schematic flowchart of a method for displaying a preview image in a zoom shooting scene according to an embodiment of this application:

FIG. 3 and FIG. 4 are schematic diagrams of shooting interfaces of an electronic device according to an embodiment of this application:

FIG. 14 is still another schematic diagram of shooting interfaces of an electronic device according to an embodiment of this application:

FIG. 15 is another schematic flowchart of a method for displaying a preview image in a zoom shooting scene according to an embodiment of this application;

FIG. 19 is another schematic flowchart of a method for displaying a preview image in a zoom shooting scene according to an embodiment of this application; and FIG. 20 is a schematic diagram of another structure of an electronic device according to an embodiment of this application.

DESCRIPTION OF EMBODIMENTS

Figure 1:
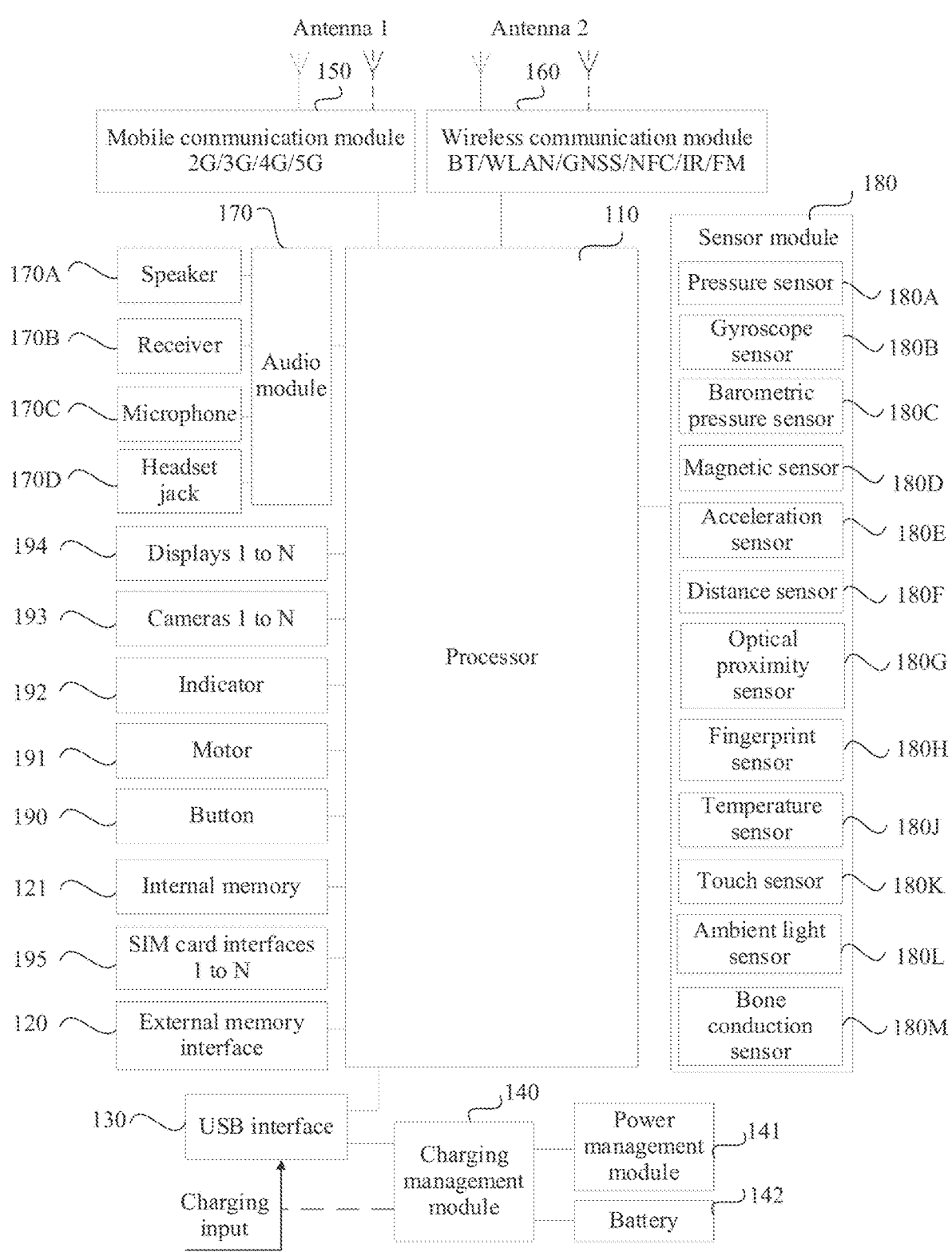
FIG. 1 is a schematic diagram of a hardware structure of an electronic device according to an embodiment of this application.

Some terms in embodiments of this application are explained below first, to facilitate understanding of a person skilled in the art.

A preview image in embodiments of this application is an image displayed on a shooting interface (or referred to as a viewfinder interface) of an electronic device. For example, the electronic device is a mobile phone. The mobile phone starts a camera application, turns on a camera, and displays a shooting interface. A preview image is displayed on the shooting interface, and the preview image is an image acquired by the camera.

A field of view in embodiments of this application is an important performance parameter of the camera. In addition, the "field of view" may also be referred to as terms such as a "field of vision", a "visual field", or a "visual field range". This specification imposes no limitation on the name. The field of view is used to indicate a maximum shooting angle range of the camera. If an object is within the angle range, the object is captured by the camera and therefore is further presented in a preview image. If an object is outside the angle range, the object is not captured by the camera and therefore is not presented in a preview image. Generally, a larger field of view of the camera indicates a larger shooting range and a shorter focal length: and a smaller field of view of the camera indicates a smaller shooting range and a longer focal length. Therefore, cameras may be classified into a common camera, a wide-angle camera, an ultra-wide-angle camera, and the like due to different fields of view. For example, a focal length of the common camera may range from 40 millimeters to 45 millimeters, and a field of vision may range from 40 degrees to 60 degrees: a focal length of the wide-angle camera may range from 24 millimeters to 38 millimeters, and a field of vision may range from 60 degrees to 84 degrees; and a focal length of the ultra-wide-angle camera may range from 13 millimeters to 20 millimeters, and a field of vision may range from 94 degrees to 118 degrees.

The method for displaying a preview image in a zoom shooting scene provided in this embodiment of this application may be applied to an electronic device. The electronic device includes a camera. The camera may be a wide-angle camera or an ultra-wide-angle camera, or may be a common camera. A quantity of cameras is not limited in this application. There may be one or more cameras. If there are a plurality of cameras, the plurality of cameras may include at least one wide-angle camera or at least one ultra-wide-angle camera. The electronic device may be a portable electronic device, such as a mobile phone, a tablet computer, a portable computer, a wearable device (such as a smartwatch, smart glasses, a smart band, or a smart helmet) with a wireless communication function, or a vehicle-mounted device. An example embodiment of the portable electronic device includes but is not limited to a portable electronic device equipped with iOS®, Android®, Microsoft®, or another operating system.

FIG. 1 is a schematic diagram of a structure of an electronic device. As shown in FIG. 1, the electronic device may include a processor 110, an external memory interface

120, an internal memory 121, a universal serial bus (universal serial bus. USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the electronic device. The controller may generate an operation control signal based on instruction operation code and a time sequence signal, to complete control of instruction fetching and instruction execution. A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

The USB interface 130 is an interface that conforms to a USB standard specification, and may be specifically a mini USB interface, a micro USB interface, a USB type-C interface, or the like. The USB interface 130 may be configured to connect to a charger to charge the electronic device, and may be further configured to transmit data between the electronic device and a peripheral device. The charging management module 140 is configured to receive a charging input from a charger. The power management module 141 is configured to connect to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communication module 160, and the like.

A wireless communication function of the electronic device may be implemented by using the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna of the electronic device may be configured to cover one or more communication frequency bands. Different antennas may be further multiplexed, to improve antenna utilization. For example, the antenna 1 may be multiplexed as a diversity antenna of a wireless local area network. In some other embodiments, the antennas may be used in combination with a tuning switch.

The mobile communication module 150 may provide a solution that includes wireless communication such as 2G/3G/4G/5G and that is applied to the electronic device. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation by using the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The wireless communication module 160 may provide a wireless communication solution that is applied to the electronic device and that includes a wireless local area network (wireless local area network, WLAN) (for example, a wireless fidelity (wireless fidelity. Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like. The wireless communication module 160 may be one or more components integrating at least one communication processor module. The wireless communication module 160 receives an electromagnetic wave by using the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation by using the antenna 2.

In some embodiments, in the electronic device, the antenna 1 and the mobile communication module 150 are coupled, and the antenna 2 and the wireless communication module 160 are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access. TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system. GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The display 194 is configured to display a display interface of an application, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device may include one or N displays 194, where N is a positive integer greater than 1.

The electronic device may implement a shooting function by using the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scene. In some embodiments, the ISP may be disposed in the camera 193.

The camera 193 is configured to capture a static image or a video. An optical image of an object is generated through a lens, and is projected onto a photosensitive element. The photosensitive element may be a charge coupled device (charge coupled device, CCD), or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1.

The internal memory 121 may be configured to store computer-executable program code, where the executable program code includes instructions. The processor 110 runs the instructions stored in the internal memory 121, to perform various function applications and data processing of the electronic device. The internal memory 121 may include a program storage area and a data storage area. An operating system, software code of at least one application (for example, iQIYI or WeChat), and the like may be stored in the program storage area. The data storage area may store data (for example, an image, a video) created during use of the electronic device. In addition, the internal memory 121 may include a high-speed random access memory, or may include a non-volatile memory, for example, at least one magnetic disk storage device, a flash memory, or a universal flash storage (universal flash storage, UFS), and the like.

The external memory interface 120 may be configured to connect to an external storage card, for example, a micro-SD card, to extend a storage capability of the electronic device. The external storage card communicates with the processor 110 by using the external memory interface 120, to implement a data storage function. For example, files such as a picture or a video are stored in the external storage card.

The electronic device may implement an audio function, for example, music playing and recording, by using the audio module 170, the speaker 170A, the receiver 170B, the microphone 170C, the headset jack 170D, the application processor, and the like. For example, music playing, recording, and the like.

The pressure sensor 180A is configured to sense a pressure signal, and can convert the pressure signal into an electrical signal. In some embodiments, the pressure sensor 180A may be disposed on the display 194. The gyroscope sensor 180B may be configured to determine a motion posture of the electronic device. In some embodiments, an angular velocity of the electronic device around three axes (namely, axes x, y, and z) may be determined by using the gyroscope sensor 180B.

The gyroscope sensor 180B may be configured to implement image stabilization during shooting. The barometric pressure sensor 180C is configured to measure barometric pressure. In some embodiments, the electronic device calculates an altitude based on a value of the barometric pressure measured by the barometric pressure sensor 180C, to assist in positioning and navigation. The magnetic sensor 180D includes a Hall sensor. The electronic device may detect, by using the magnetic sensor 180D, opening and closing of a flip cover. In some embodiments, when the electronic device is a flip phone, the electronic device may detect, by using the magnetic sensor 180D, opening and closing of a flip cover. Further, a feature such as automatic unlocking through flipping a cover is set based on a detected opening or closing state of the leather case or a detected opening or closing state of the flip cover. The acceleration sensor 180E may detect a magnitude of acceleration of the electronic device in each direction (generally three axes). The magnitude and direction of gravity can be detected when the electronic device is stationary. The acceleration sensor 180E may be further configured to identify a posture of the electronic device, and is used in switching between a landscape mode and a portrait mode or application such as a pedometer.

The distance sensor 180F is configured to measure a distance. The electronic device may measure the distance through infrared or laser. In some embodiments, in a shooting scene, the electronic device may measure the distance by using the distance sensor 180F, to implement quick focusing. The optical proximity sensor 180G may include, for example, a light emitting diode (LED) and an optical detector, for example, a photodiode. The light emitting diode may be an infrared light emitting diode. The electronic device emits infrared light by using the light-emitting diode. The electronic device detects reflected infrared light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device may adaptively adjust brightness of the display 194 based on the sensed ambient light brightness. The ambient light sensor 180L may be further configured to automatically adjust white balance during shooting. The ambient light sensor 180L may further cooperate with the optical proximity sensor 180G to detect whether the electronic device is in a pocket, to avoid an accidental touch. The fingerprint sensor 180H is configured to collect a fingerprint. The electronic device may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device performs a temperature processing policy by using the temperature detected by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194. In some other embodiments, the touch sensor 180K may be alternatively disposed on a surface of the electronic device, and is located on a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may be in contact with a human pulse, to receive a blood pressure pulsation signal.

The button 190 includes a power button, a volume button, and the like. The button 190 may be a mechanical button, or may be a touch button. The electronic device may receive a button input, and generate a button signal input related to user settings and function control of the electronic device. The motor 191 may generate a vibration prompt. The motor 191 may be configured to provide an incoming call vibration prompt or a touch vibration feedback. For example, touch operations performed on different applications (for example, shooting and audio playing) may correspond to different vibration feedback effects. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device.

It may be understood that the components shown in FIG. 1 do not constitute a specific limitation on the electronic device. The electronic device in this embodiment of the present invention may include more or fewer components than those in FIG. 1. In addition, a combination/connection relationship between the components in FIG. 1 may also be adjusted and modified.

When the electronic device has a zoom shooting function, when detecting an operation for increasing a zoom ratio, the electronic device may zoom in a distant object for shooting. A general zoom shooting procedure is as follows: a user opens a camera application in an electronic device, and starts a camera. The electronic device displays a shooting interface, and the shooting interface displays a preview image, that is, an image acquired by the camera. When there is an object (for example, a flower) that the user wants to shoot an image of in the preview image, the user may want to zoom in the shooting object for shooting, and then perform an operation of increasing a zoom ratio (for example, a sliding operation of moving an index finger relatively away from a middle finger). When the electronic device detects the operation for increasing the zoom ratio, the preview image displayed on the shooting interface is updated to an image block in a central region on the image acquired by the camera. That is, the image block in the central region is zoomed in and displayed. However, an object (for example, the flower) that the user wants to shoot an image of may not be located in the central region. In this case, the updated preview image does not have the object (for example, the flower) that the user wants to shoot an image of. In this case, the user needs to move the mobile phone to search for the shooting object. However, a searching process is time-consuming and labor-consuming. In addition, once the mobile phone moves at a relatively high speed, the target object is easily missed, resulting in inconvenience and poor experience.

In view of this, an embodiment of this application provides a method for displaying a preview image in a zoom shooting scene. In the method, after starting a camera application, an electronic device displays a shooting interface, and a first preview image is displayed on the shooting interface. The first preview image is a first image acquired by a camera. The first image may be an image or an image stream acquired by the camera. When an operation for increasing a zoom ratio is detected, a target shooting object on the first image is determined in response to the operation. The target shooting object may be at any location on the first image, and may not be in a central region on the first image. Then, a second preview image is displayed on a shooting interface of the camera application. The second preview image is an image block in a first region on the first image, and the first region is a region in which the at least one target shooting object on the first image is located. To be specific, when the electronic device detects the operation for increasing the zoom ratio, the first preview image on the shooting interface is updated to the second preview image in response to the operation, and the second preview image is an image block in a region in which the at least one target shooting object on the first image is located. For example, if the at least one target shooting object is located in an upper left corner of the first image, the second preview image is an image block in an upper left corner region of the first image: or if the at least one target shooting object is located in a lower right corner of the first image, the second preview image is an image block in a lower right corner region of the first image. The zoom shooting procedure in this application is different from the foregoing general zoom shooting procedure. In the general zoom shooting procedure, when the operation for increasing the zoom ratio is detected, the displayed second preview image is definitely an image block in the central region on the first image. Therefore, if there is no object that the user wants to shoot an image of in the central region, the user needs to move a location of the electronic device to search for the shooting object. However, in the method for displaying a preview image in a zoom scene provided in this application, when the zoom ratio is increased, the second preview image is an image block in a region in which the at least one target shooting object on the first image is located. Moving the location of the electronic device to search for the target shooting object is not required, and an operation is convenient.

For ease of understanding, in the following embodiment of this application, a method for displaying a preview image in a zoom shooting scene provided in this embodiment of this application is specifically described with reference to accompanying drawings by using an example in which the electronic device is a mobile phone.

Embodiment 1

FIG. 2 is a schematic flowchart of a method for displaying a preview image in a zoom shooting scene according to an embodiment of this application. The method is applicable to the electronic device having a hardware structure shown in FIG. 1, for example, a mobile phone or a tablet computer. The following mainly uses a mobile phone as an example for description. As shown in FIG. 2, the procedure includes the following steps:

S201: Start a camera application to turn on a camera, and display a shooting interface, where a first preview image is displayed on the shooting interface, and the first preview image is a first image acquired by the camera.

For example, with reference to (a) in FIG. 3, a graphical user interface (graphical user interface, GUI) of the mobile phone is shown, and the GUI is a desktop 301 of the mobile phone. When detecting an operation that a user taps an icon 302 of a camera application (application, APP) on the desktop 301, the mobile phone may start the camera application, and display another GUI as shown in (b) in FIG. 3. The GUI may be referred to as a shooting interface (or referred to as a viewfinder interface) 303. In a preview state, the shooting interface 303 may display a preview image in real time. For example, with reference to (b) in FIG. 3, a first preview image is displayed on the shooting interface 303, and the first preview image is a first image acquired by a camera. It should be noted that the first image may be an image, or may be an image stream acquired by a camera. If the camera is a wide-angle camera, the first image is a large field of vision (field of vision, FOV) image. Still with reference to (b) in FIG. 3, the shooting interface 303 may further include a control 305 used to indicate a shooting mode, a control 306 used to indicate a video recording mode, and a shooting control 307. In the shooting mode, after the mobile phone detects an operation that the user taps the shooting control 307, the mobile phone performs a shooting operation. In the video recording mode, after the mobile phone detects an operation that the user taps the shooting control 307, the mobile phone performs a video shooting operation.

S202: Determine whether a trigger condition is detected.

The trigger condition may be that an operation for increasing a zoom ratio of the camera application is detected, and/or it is detected that a zoom ratio is increased to a preset zoom ratio (or a threshold). The preset zoom ratio may be any value between a minimum zoom ratio and a maximum zoom ratio. For example, the zoom ratio ranges from 1× to 10×, and the preset zoom ratio may be 5×, 6×, 7×, 9×, 10×, or the like. A specific value of the preset zoom ratio may be set by default after the electronic device is delivered from a factory, or may be set by a user. This is not limited in this application. Alternatively, the preset zoom ratio may be a lossless zoom ratio. Zoom shooting includes physical zoom and electronic zoom. The physical zoom means that a physical change of a camera (for example, a location movement of a lens) is used to implement zooming, and the electronic zoom means that an image acquired by the camera is processed by using an image processing algorithm (for example, a pixel interpolation algorithm) to implement zooming. The lossless zoom ratio may be understood as a boundary point between the physical zoom and the electronic zoom. That is, in a process of increasing the zoom ratio, before the zoom ratio reaches a lossless zoom ratio, a physical zoom manner may be used. In this way, an image acquired by the camera is physically zoomed and has relatively high definition. When the zoom ratio exceeds the lossless zoom ratio, the electronic zoom may be used because the physical zoom has reached a limit. However, because the electronic zoom needs to perform post-processing (for example, pixel interpolation processing) on an image acquired by a camera, definition of the image is reduced. Therefore, if the zoom ratio threshold (that is, the preset zoom ratio) is set to the lossless zoom ratio, it may be ensured that the acquired first image is physically zoomed and definition is not reduced. If the definition of the first image is relatively high, accuracy of identifying the target shooting object in a subsequent processing procedure can be improved. In addition, when an image block is cropped from the first image and zoomed in into a preview image, user shooting experience is not affected due to excessively low definition. It may be understood that, if the lossless zoom ratio is a value, the preset zoom ratio may be the value: or if the lossless zoom ratio is a range, the preset zoom ratio may be any value within the range, for example, a maximum value.

Figure 4:
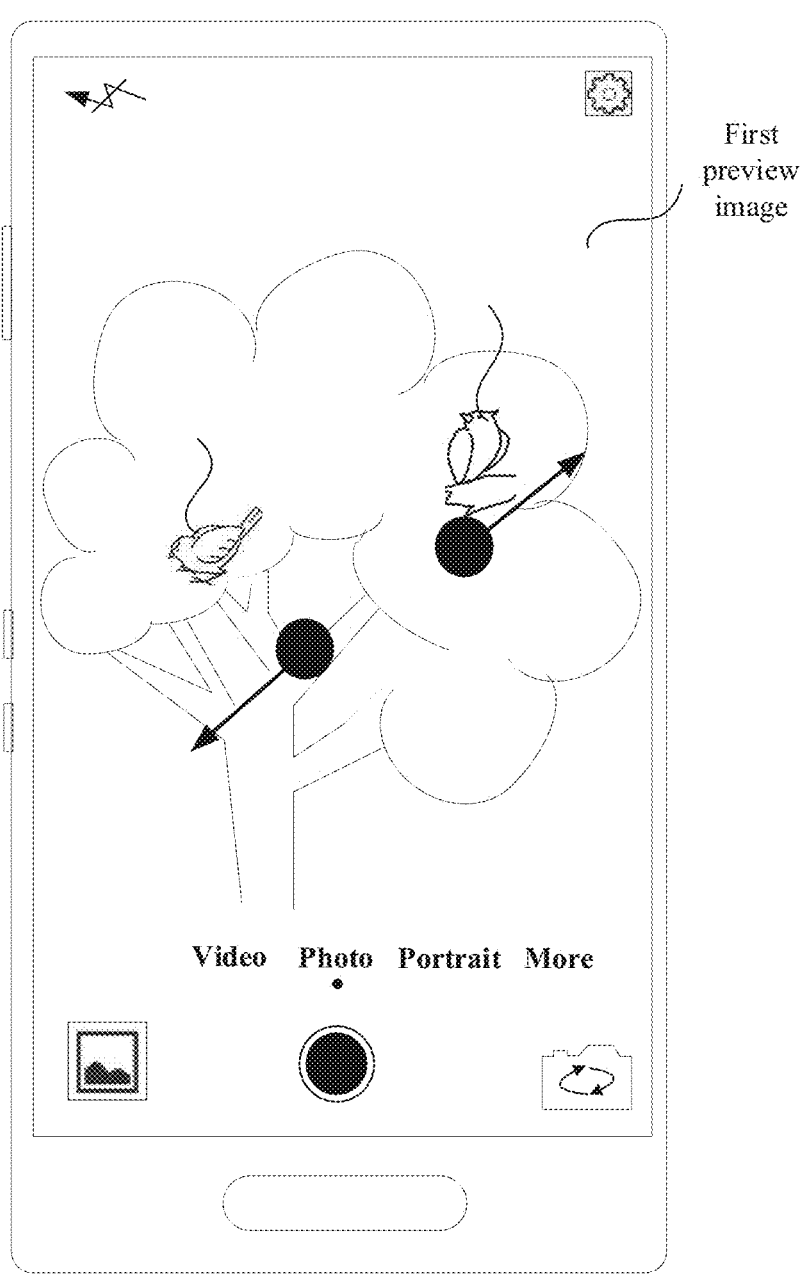

The operation for increasing the zoom ratio of the camera application may be a sliding operation in FIG. 4 of moving an index finger relatively away from a thumb (in FIG. 4, two black dots respectively represent contact points between different fingers and the screen, and an arrow represents a sliding direction). Alternatively, the operation for increasing the zoom ratio of the camera application may be a preset gesture operation. The preset gesture operation may be single/double-tapping, circle drawing, knuckle tapping, multi-finger tapping, multi-finger sliding up, or the like at a location (the location may be preset or any location) on the shooting interface. This is not limited in this embodiment of this application. Alternatively, the operation for increasing the zoom ratio of the camera application may be an operation for a specific physical button or a virtual button. For example, a virtual button may be further displayed on the shooting interface, and when an operation for the virtual button is detected, it is determined to increase a zoom ratio of the camera application. For another example, when detecting that a physical button is triggered, or a plurality of physical buttons are triggered in combination, the electronic device determines to increase the zoom ratio of the camera application. Alternatively, the operation for increasing the zoom ratio of the camera application may be a voice instruction instructing to increase the zoom ratio. For example, the voice instruction may be a voice instruction of "magnify shooting" or "magnify an image".

S203: Identify a target shooting object on the first image if a trigger condition is detected. The target shooting object is one or more shooting objects on the first image.

The target shooting object may be one or more objects on the first image. The one or more objects may be one or more objects of a same type or one or more objects of different types, which is not limited herein.

When there are a plurality of objects on the first image, the target shooting object may be a target object in all objects. For example, the target object may be a preset object. When determining that a preset object exists on the first image, the electronic device determines the preset object as the target shooting object. The preset object may be an object set by default, or may be preset by the user. This is not limited in this embodiment of this application. For another example, the target object may alternatively be an object that the user is interested in. In other words, the electronic device determines the target shooting object on the first image based on the object that the user is interested in. The object that the user is interested in may be an object that the user frequently shoots an image of and that is recorded by the electronic device, or an object that is frequently re-edited. In an implementation, for example, the object is a cat. If the electronic device determines that there are a relatively large quantity of images of the cat in the images stored in a gallery, the electronic device determines that the object that the user is interested in is the cat. In another possible implementation, the electronic device records an object with a relatively large quantity of image re-editing times when the user uses modification software to re-edit the image, and determines that the object with a relatively large quantity of image re-editing times is an object that the user is interested in. When determining that the object that the user is interested in exists on the first image, the electronic device determines the object as the target shooting object.

Alternatively, the target shooting object may be one or more object types on the first image. One object type may correspond to one or more objects of the type. In other words, when the target shooting object is an object type, the target shooting object includes all objects of the object type on the first image. For example, an image includes a person 1 and a person 2. If the target shooting object is an object type "person", it is identified that the target shooting object on the first image includes two objects: the person 1 and the person 2.

When there are a plurality of object types on the first image, the target shooting object may be a target object type in the plurality of object types. The target object type may be any one or more of the plurality of object types. If the target object type is a plurality of object types, the plurality of object types are simultaneously identified. For example, the target object type is an object type with a high priority in the plurality of object types. For example, a priority relationship is as follows: a person>an animal>text>food>a flower>a green plant>a building. The electronic device may first identify whether the first image includes the "person" type. If the "person" type is included, the electronic device determines all objects (that is, all persons on the first image) of the "person" type on the first image as target shooting objects. If the "person" type is not included, the electronic device continues to identify whether the first image includes the "animal" type. If the "animal" type is included, the electronic device determines all objects of the "animal" type on the first image as target shooting objects. Certainly, if the "animal" type is not included, the electronic device continues to identify an object type of a next level, and so on. The priority relationship may be set by default before delivery, or may be set by the user. This is not limited in this application. For another example, the target object type may alternatively be a preset object type. The preset object type may be an object type set by default at delivery or an object type set by the user. This is not limited in this embodiment of this application. For another example, the target object type may alternatively be an object type that the user is interested in. In other words, the electronic device determines the target shooting object on the first image based on the object type that the user is interested in. In an implementation, for example, the object is a cat. If the electronic device determines that there are a relatively large quantity of images of the cat in the images stored in the gallery, the electronic device determines that the object type that the user is interested in is the "animal" type. In another possible implementation, the electronic device records an object with a relatively large quantity of image re-editing times when the user uses the modification software to re-edit the image, and determines that an object type of the object with a relatively large quantity of image re-editing times is an object type that the user is interested in.

The foregoing lists manners of determining the target shooting object. In actual application, there may be another manner of determining the target shooting object. Examples are not provided one by one in this embodiment of this application.

Figure 5:
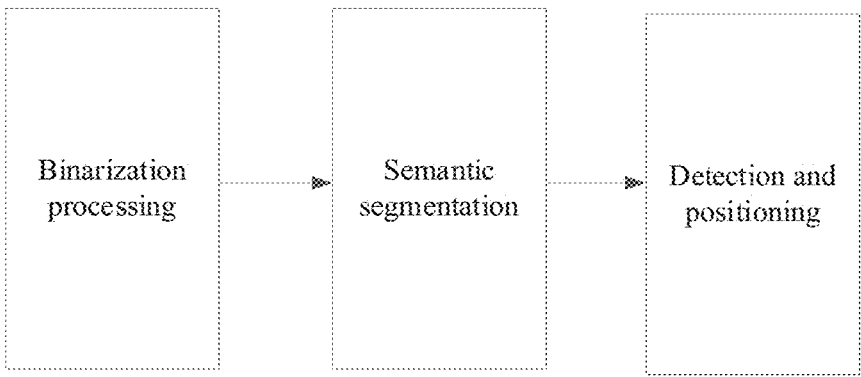
FIG. 5 is a schematic flowchart of a subject identification algorithm according to an embodiment of this application.

In this embodiment of this application, an algorithm used to identify the target shooting object on the first image is referred to as a subject identification algorithm, and the subject identification algorithm may be an image semantic analysis algorithm. FIG. 5 is a schematic flowchart of an image semantic analysis algorithm. Simply speaking, it includes three steps: image binarization processing, semantic segmentation, and detection and positioning. The binarization processing means setting a grayscale value of a pixel on the image to 0 or 255. A total of 256 grayscale values from 0 to 255 are reduced to only two grayscale values: 0 and 255. Because the binarization processing can simplify the grayscale value of the image, if the image obtained after the binarization processing is used as an input image for subsequent processing (that is, semantic segmentation and detection and positioning), a speed of subsequent processing can be improved. Semantic segmentation may be understood as dividing an image into different segmentation regions, and adding a corresponding semantic label to each segmentation region, for example, representing a feature in the segmentation region. Generally, textures and grayscales in each segmentation region obtained through semantic segmentation are similar, and boundaries of different segmentation regions are clear. In this way, in a next processing procedure, that is, detection and positioning, detection may be performed in each segmentation region on the image, and specifically, a target shooting object in each segmentation region is specified.

A sequence of performing S202 and S203 is not limited in this application. If S202 is performed before S203, in an example, when detecting a trigger condition (that is, S202), the electronic device enables the subject identification algorithm, and then identifies the target shooting object on the first image by using the algorithm. In this manner, the subject identification algorithm may be disabled when not used, and the algorithm is enabled when a trigger condition is detected, which helps reduce power consumption. In some other examples, the subject identification algorithm is always in an enabled state, and when a trigger condition (that is, S202) is detected, the subject identification algorithm starts to be used for identification. In this manner, the time required for enabling the algorithm is reduced, and efficiency is higher. If S203 is performed before S204, in an example, when the electronic device opens the camera application (that is, S201), the electronic device enables the subject identification algorithm, and identifies the target shooting object on the first image by using the algorithm (that is. S203). When a trigger condition (that is, S202) is detected, S204 is performed. In this manner, because identification has been performed by the subject identification algorithm before the trigger condition is detected, S204 can be quickly performed after the trigger condition is detected, and user experience is relatively good. In another example, the subject identification algorithm is always in an enabled state, and when the electronic device opens the camera application (that is, S201), the electronic device starts to use the subject identification algorithm for identification. In this manner, the time required for enabling the algorithm is reduced, and efficiency is higher.

S204: Display a second preview image on the shooting interface, where the second preview image is an image block in a first region on the first image, and the first region is a region in which the at least one target shooting object is located.

For ease of description, the at least one target shooting object is referred to as a first target shooting object. That is, there may be one or more first target shooting objects. For ease of description, the following mainly uses an example in which there is one first target shooting object for description.

It should be noted that there may be a plurality of target shooting objects identified in S203. Therefore, before S204, the method may further include the following step: determining the first target shooting object from the plurality of target shooting objects. There may be a plurality of manners of determining the first target shooting object from the plurality of target shooting objects. For example:

Manner 1: The first target shooting object is determined based on locations of the plurality of target shooting objects. For example, the first target shooting object is a target shooting object closest to an image center in all target shooting objects, or a target shooting object closest to an image edge.

Manner 2: The first target shooting object is determined based on sizes of regions occupied by the plurality of target shooting objects. For example, the first target shooting object is a target shooting object that occupies a largest or smallest area in all target shooting objects.

Manner 3: If a plurality of target shooting objects correspond to a plurality of object types, the first target shooting object is determined based on object types of the plurality of target shooting objects. For example, the object types corresponding to the plurality of target shooting objects include a person type and an animal type. It may be determined, based on a priority relationship, that a priority of the person type is higher than that of the animal type. In this case, a shooting object of the person type in the plurality of target shooting objects is the first target shooting object. The priority relationship may include a person>an animal>text>food>a flower>a green plant>a building. Optionally, the priority relationship may be adjusted by the user.

Manner 4: The first target shooting object is determined from the plurality of target shooting objects based on a specified operation of the user.

For example, FIG. 4 is still used as an example. When the electronic device detects an operation for increasing the zoom ratio (for example, a sliding operation of moving an index finger relatively away from a thumb), and identifies that the first image includes two target shooting objects (for example, two birds), the electronic device displays a shooting interface shown in FIG. 6, and the shooting interface displays prompt information: "Please select the first target shooting object", and further displays numbers of all identified target shooting objects. For example, a number of a bird 1 is 1, and a number of a bird 2 is 2. When detecting an operation of tapping the number 2 by the user, the electronic device determines that the bird 2 is the first target shooting object specified by the user. In Manner 4, the first target shooting object may be determined based on user selection, which meets a user preference.

Optionally before S204, the method may further include the following step: determining a first region based on the first target shooting object. Specifically, the method may include: determining the first region based on the first target shooting object and resolution of the preview image.

Figure 6:
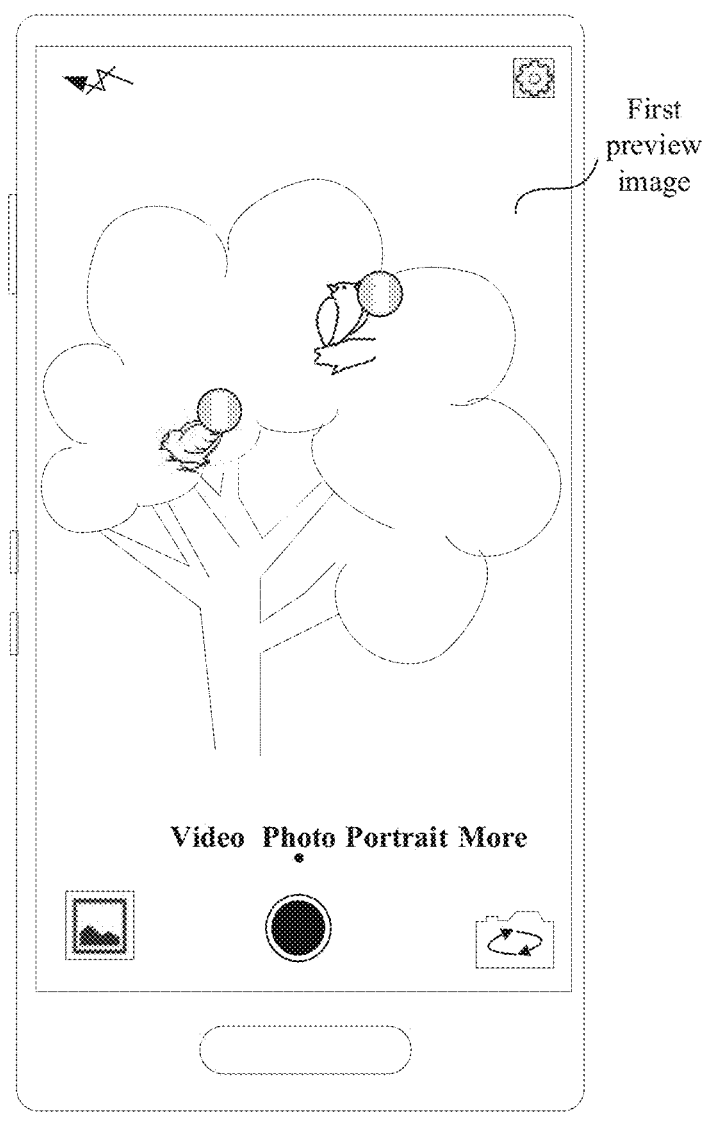
FIG. 6 is a schematic diagram in which an electronic device prompts a user to select a target shooting object according to an embodiment of this application.
Figure 7A:
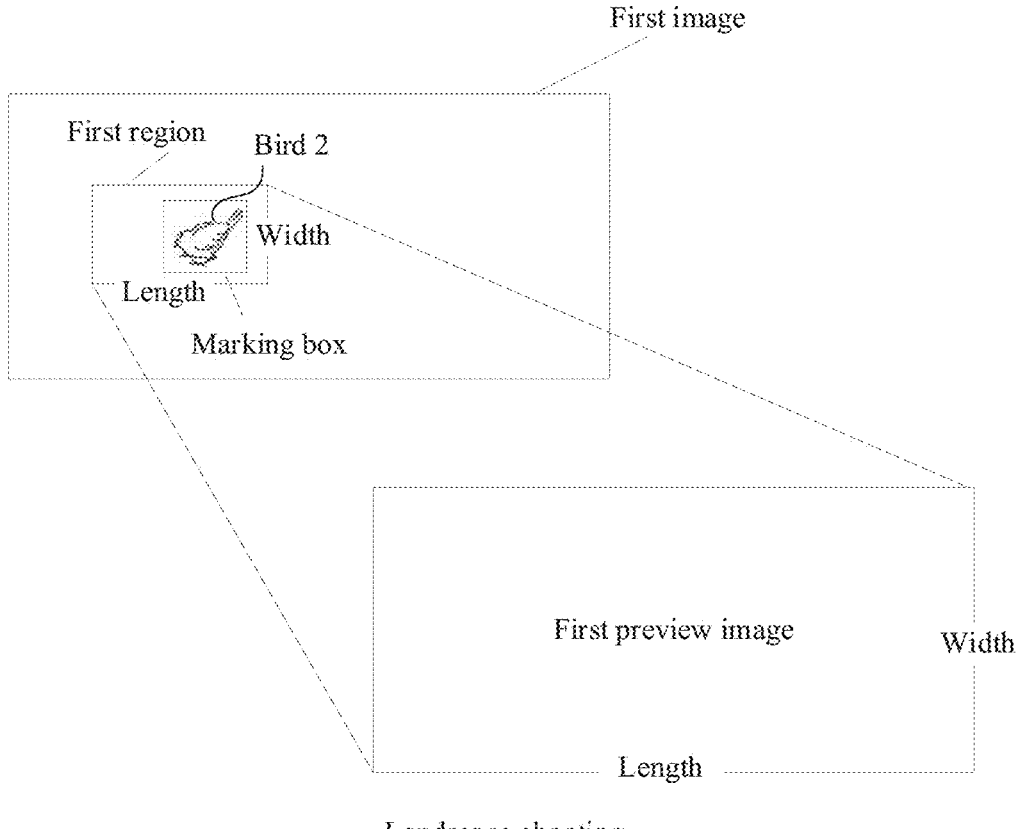
FIG. 7A and FIG. 7B are schematic diagrams of matching marking boxes with preview images according to an embodiment of this application.

FIG. 6 is used as an example. It is assumed that the first target shooting object is the bird 2 on the first image. In this case, a manner of determining the first region includes: setting a marking box to enclose the bird 2, with reference to FIG. 7A. A shape of the marking box is not limited in this application, and the marking box may be a rectangle, a square, a circle, an ellipse, or the like. Alternatively, the marking box may be a minimum circumscribed polygon of an edge contour of the target shooting object. Then, the first region is determined. The first region includes a region enclosed by the marking box, and resolution of the first region matches the resolution of the preview image. That the resolution of the first region matches the resolution of the preview image may include the following two cases:

(1) If a picture is shot in a landscape mode, with reference to FIG. 7A, a length of the preview image is greater than a width. That is, the resolution (a length-width ratio) is greater than 1, the length-width ratio of the first region is also greater than 1, for example, may be equal to the resolution of the preview image. For example, if the resolution of the preview image is 16:4, the length-width ratio of the first region is 16:4. In this way, the length-width ratio of the image block in the first region does not need to be adjusted to adapt to a size requirement of the preview image, which is relatively convenient.

Figure 7B:
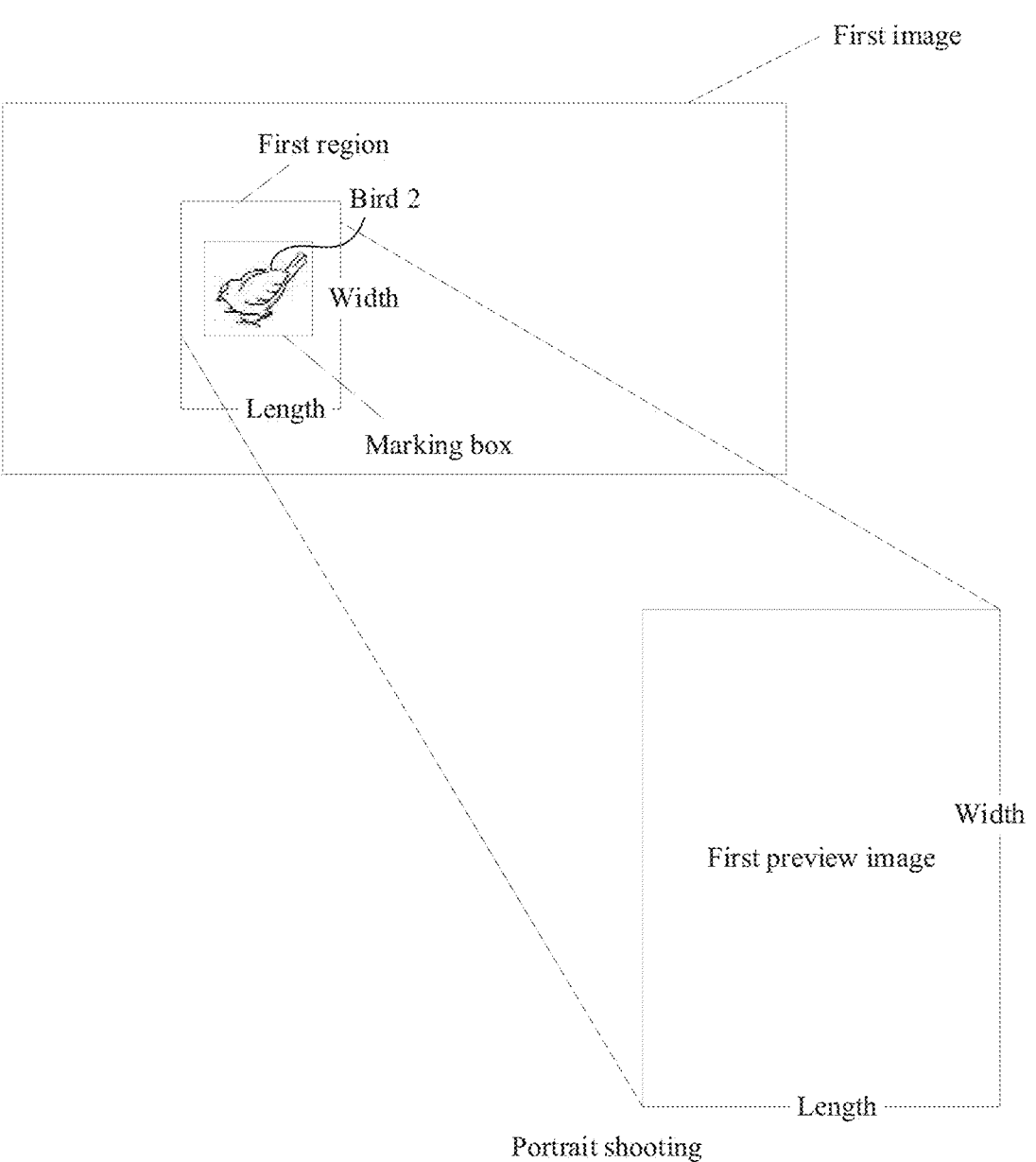

(2) If a picture is shot in a portrait mode, with reference to FIG. 7B, a length of the preview image is less than a width. That is, the resolution (a length-width ratio) is less than 1, the length-width ratio of the first region is also less than 1, for example, may be equal to the resolution of the preview image. For example, if the resolution of the preview image is 4:16, the length-width ratio of the first region is 4:16. That is, the length-width ratio of the image block in the first region does not need to be adjusted to adapt to a size requirement of the preview image.

After determining the first region, the electronic device displays the image block in the first region as a second preview image on the shooting interface. For example, with reference to FIG. 8, the second preview image is displayed on the shooting interface, and the second preview image is an image block in the first region in which the bird 2 in the first image is located. It may be learned by comparing FIG. 4 with FIG. 8 that, in FIG. 4, when detecting the operation for increasing the zoom ratio (for example, the sliding operation of moving the index finger relatively away from the thumb), the electronic device zooms in and displays the first target shooting object (for example, the bird 2) on the first preview image, that is, FIG. 8. The first target shooting object is a target shooting object identified from the first preview image, and is a shooting object that the user may need to zoom in and shoot an image of. Therefore, compared with a common zoom shooting manner (an image block in a central region of an image is zoomed in for display), a probability that the user needs to move a location of the electronic device to search for a desired shooting object is relatively low, and an operation is convenient.

Figure 8:
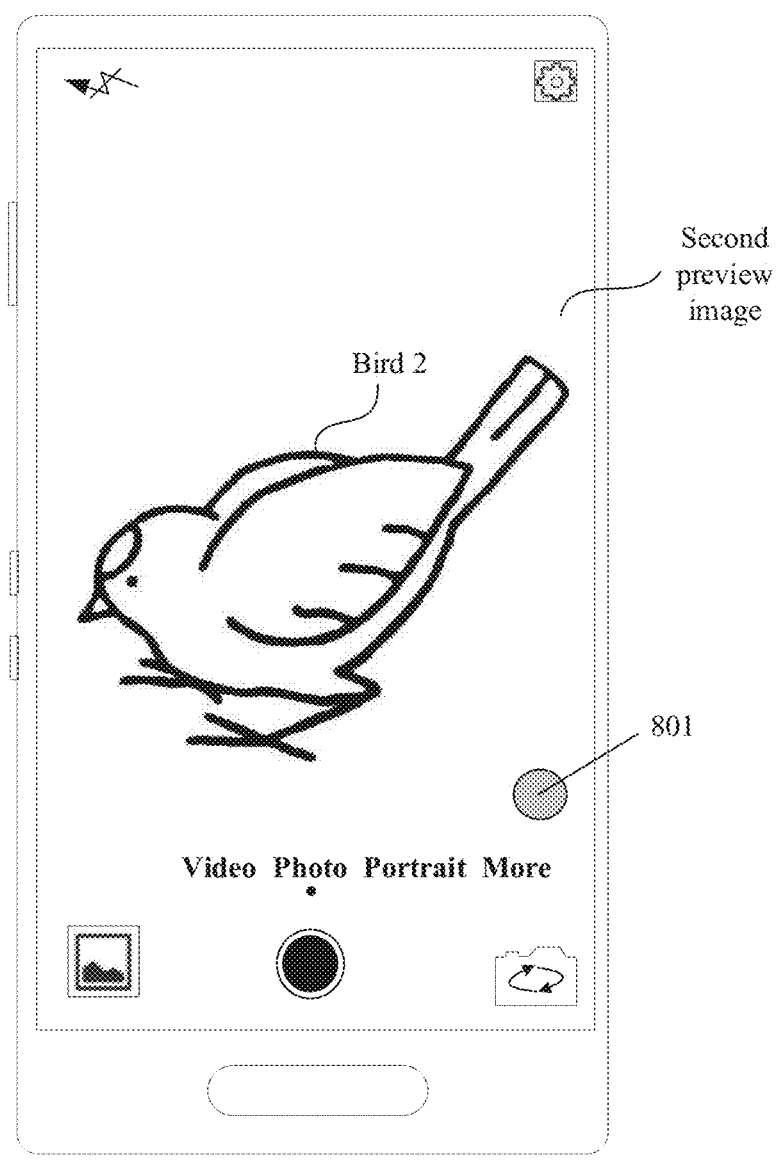
FIG. 8 to FIG. 12 are some schematic diagrams of shooting interfaces of an electronic device according to an embodiment of this application.
Figure 9:
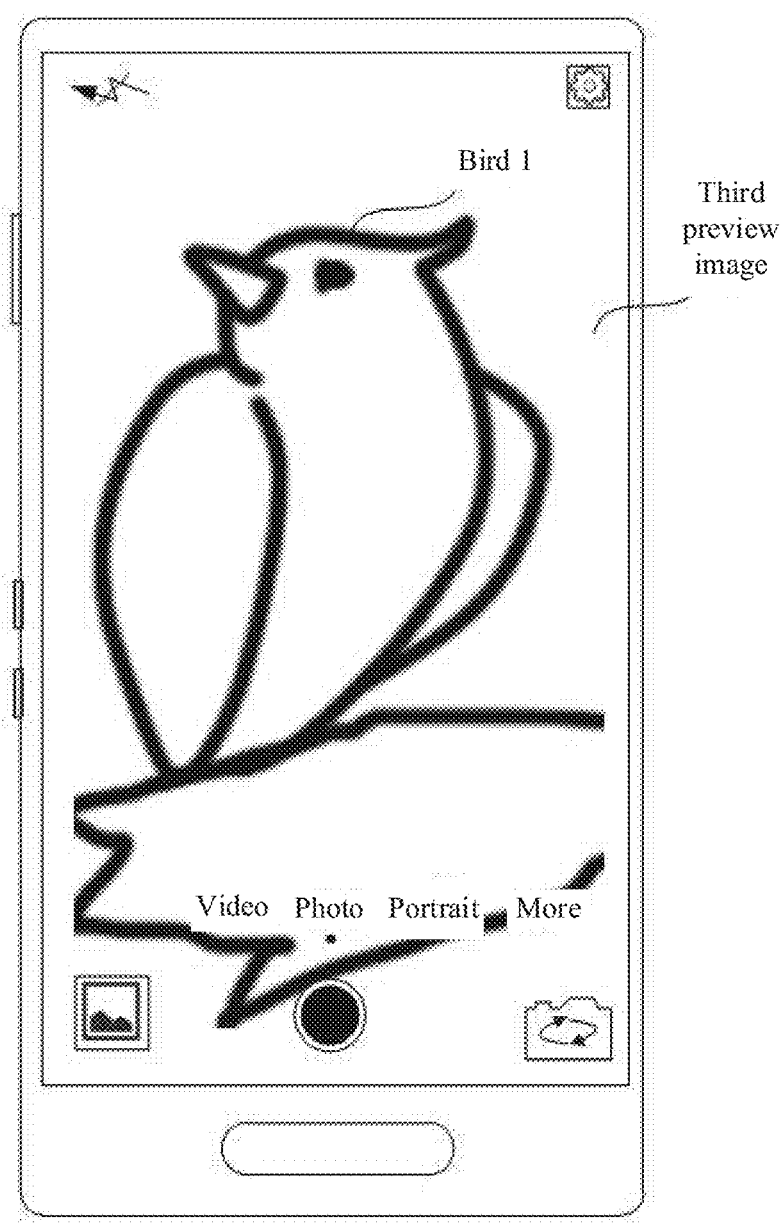

The shooting interface in FIG. 8 is a shooting interface in which an image of the bird 2 is zoomed in and shot. Optionally, the user may further switch the first target shooting object (for example, the bird 2) on the shooting interface to the second target shooting object (for example, the bird 1). For example, when the electronic device displays the second preview image and when a switching operation of the target shooting object is detected, a third preview image is displayed on the shooting interface. The third preview image is an image block in a second region in which the second target shooting object on the first image is located, and the second target shooting object is another target shooting object that is on the first image and that is different from the first target shooting object. For example, with reference to FIG. 8, when detecting a switching operation of the target shooting object, the electronic device displays a shooting interface shown in FIG. 9. The shooting interface displays the third preview image, and the third preview image is the image block in the second region in which the second target shooting object (that is, the bird 1) on the first image is located. With reference to FIG. 8 and FIG. 9, in FIG. 8, the bird 2 (the bird on the left) is zoomed in on the shooting interface. When detecting a switching operation of the target shooting object, the electronic device displays the shooting interface in FIG. 9 in which the bird 1 (the bird on the right) on the shooting interface is zoomed in. In this manner, in a zoom shooting scene, when the electronic device remains unchanged, switching of the target shooting object on the shooting interface can be implemented, and user experience is relatively good. However, in a common zoom shooting manner (an image block in a central region of an image is zoomed in for display), if a shooting object needs to be switched, a user needs to manually move a location of the electronic device to search for a desired shooting object, and an operation is complex.

It may be understood that before the third preview image is displayed, the following steps may be further included: determining the second target shooting object from remaining target shooting objects other than the first target shooting object in the plurality of target shooting objects, and determining the second region based on the second target shooting object. A principle of a manner of determining the second target shooting object is the same as that of the foregoing manner of determining the first target shooting object. Details are not described again. For example, if the first target shooting object is the bird 2, and the remaining target shooting object is only the bird 1, it is determined that the second target shooting object is the bird 1. A principle of determining the second region based on the second target shooting object is the same as that of determining the first region based on the first target shooting object. Details are not described again.

The switching operation of the target shooting object may be an operation for a specific button on the shooting interface. For example, still with reference to FIG. 8, the second preview image is displayed on the shooting interface, and a button 801 is further displayed on the shooting interface.

When an operation for the button 801 is detected, the first target shooting object is switched to the second target shooting object. When an operation for the button 801 is detected again, the second target shooting object is switched to a third target shooting object. The third target shooting object is a target shooting object other than the first target shooting object and the second target shooting object in the plurality of target shooting objects. In other words, each of the plurality of target shooting objects on the first image may be traversed by using the button 801. Alternatively, the switching operation of the target shooting object may be an operation for a physical button. For example, for an operation for a volume button, when it is detected that a button used to increase volume is tapped twice consecutively, the first target shooting object is switched to the second target shooting object. When it is detected again that the button used to increase volume is tapped twice consecutively, the second target shooting object is switched to the third target shooting object. Alternatively, the switching operation of the target shooting object may be detecting a voice instruction instructing to switch the target shooting object. For example, the voice instruction includes "next"

To help the user determine a specific target shooting object on the first image that is displayed on the current preview image (for example, the second preview image or the third preview image), a first window may be further displayed on the shooting interface. The first image is displayed in the first window, and the target shooting object displayed in a current preview image on the first image is highlighted. The highlighting may be understood as marking the target shooting object, and a marking manner is not limited, for example, circling.

Figure 10:
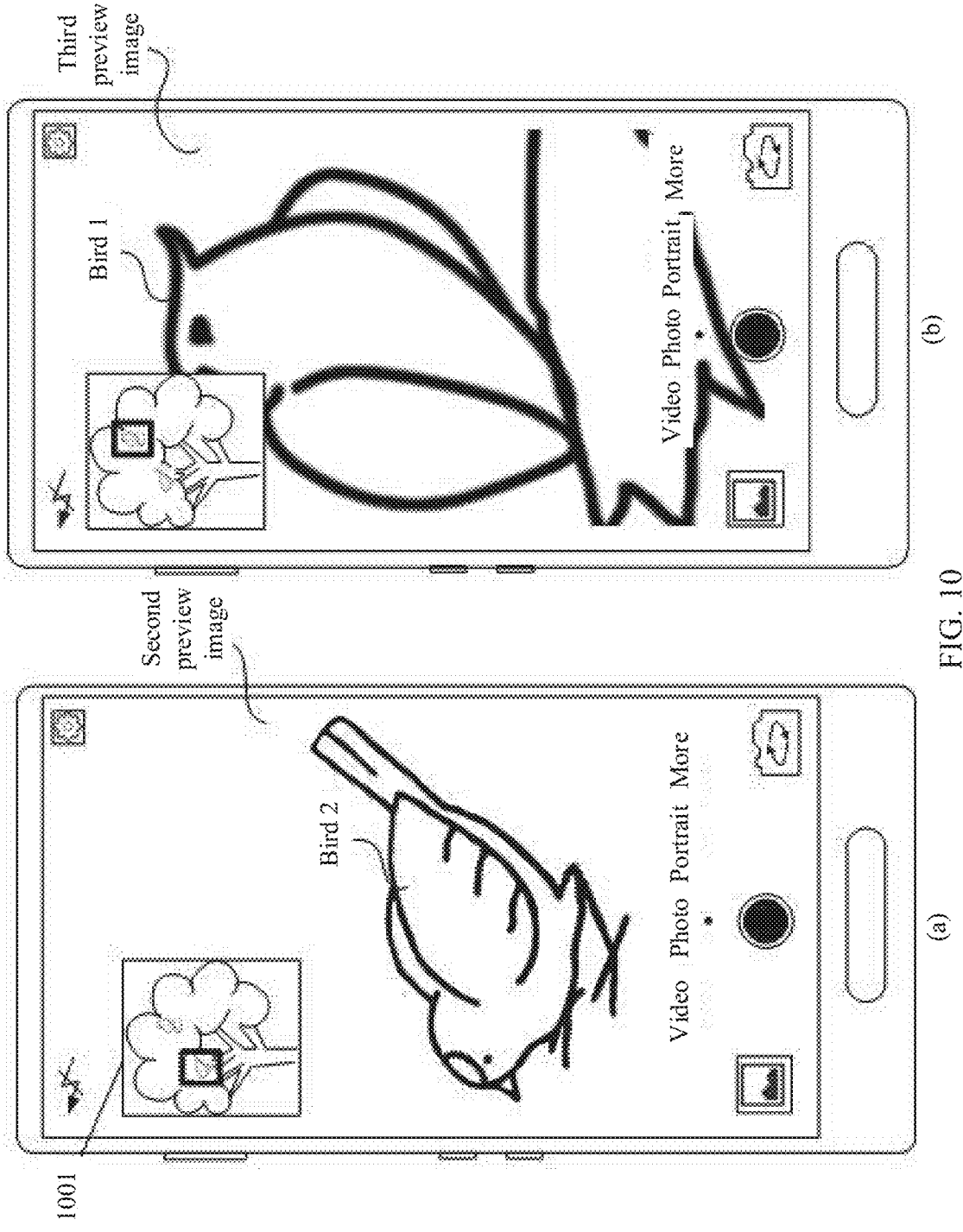

For example, with reference to (a) in FIG. 10, a first window 1001 is displayed on the second preview image, the first window 1001 includes the first image, and the bird 2 (the bird on the left) on the first image is circled, to prompt the user that a current preview image (that is, the second preview image) is a circled image block. In this way, the user may view, by using the first window 1001, a shooting object corresponding to the current preview image. When a switching operation of the target shooting object is detected, a third preview image as shown in (b) in FIG. 10 is displayed. The third preview image corresponds to the bird 1 (the bird on the right) on the first image. In this case, the bird 1 on the first image in the first window 1001 is circled, to prompt the user that a current preview image (that is, the third preview image) is a circled image block. Optionally, when the bird 1 (the bird on the right) is circled, a circled state of the bird 2 (the bird on the left) may be canceled.

Figure 11:
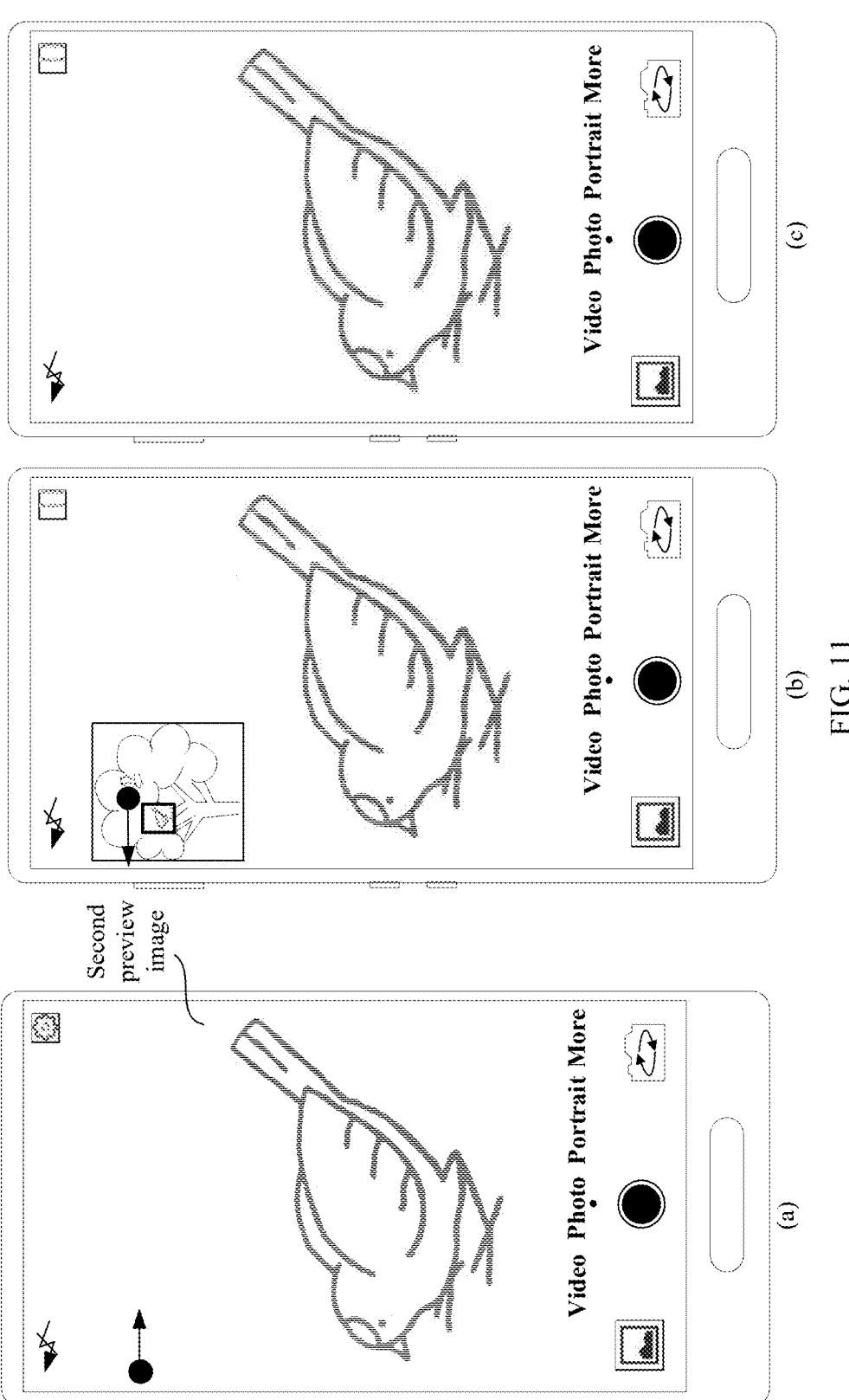

Optionally, the first window 1001 may automatically appear. For example, FIG. 4(*a*) and (a) in FIG. 10 are compared. When the electronic device displays the first preview image in FIG. 4, if an operation for increasing the zoom ratio is detected, the second preview image shown in (a) in FIG. 10 is displayed, and the first window automatically appears on the second preview image. Alternatively, FIG. 4(*a*), FIG. 8(*a*), and (*a*) in FIG. 10 are compared. When the electronic device displays the first preview image in FIG. 4, if an operation for increasing the zoom ratio is detected, the second preview image shown in FIG. 8 is displayed. That is, the first window does not appear on the second preview image. When an operation for invoking the first window is detected, an interface shown in (a) in FIG. 10 is displayed, and the first window appears. The operation for invoking the first window may be, for example, an operation for a specific button on the shooting interface. For example, a specific button is displayed on the shooting interface, and the first window is displayed when the operation for the specific button is detected. Certainly, to avoid blocking the preview image, the first window may alternatively be hidden. For example, when an operation for hiding the first window is detected, the first window is hidden. The operation for hiding the first window may be an operation for the specific button. That is, when an operation for the specific button is detected, the first window is displayed, and when an operation for the specific key is detected again, the first window is hidden. Alternatively, the operation for hiding the first window may be an operation of touching and holding the first window to move out of the screen, or a tap operation on a delete button popped up when the first window is touched and held. Alternatively, with reference to (a) in FIG. 11, when it is detected on the shooting interface that the user slides from left to right at the upper left corner, the first window is invoked, and the interface as shown in (b) in FIG. 11 is displayed. When a sliding operation of the user from right to left at the upper left corner is detected, the first window is hidden, and an interface as shown in (c) in FIG. 11 is displayed.

In the embodiment shown in FIG. 10, in the first window 1001, only a target shooting object displayed in the current preview image is marked, and a target shooting object not displayed in the current preview image is not marked. For example, in (a) in FIG. 10, only the bird 2 on the left is marked in the first window 1001. Because there is no bird 1 on the second preview image, the bird 1 in the first window 1001 is not marked. Optionally, in some other embodiments, all target shooting objects on the first image in the first window 1001 may be marked. For example, with reference to (a) in FIG. 12, both the bird 1 and the bird 2 on the first image in the first window 1001 are marked. For example, each of them corresponds to a marking box (the bird 2 on the left corresponds to a marking box 1002, and the bird 1 on the right corresponds to a marking box 1003). Because the current preview image is the second preview image, that is, corresponds to the bird 2 on the left, the marking box 1002 is highlighted relative to the marking box 1003. In this way, the user may determine that the current preview image corresponds to the bird 2. When a switching operation of the target shooting object is detected, and the first target shooting object (that is, the bird 2 on the left) is switched to the second target shooting object (that is, the right bird 1), with reference to (b) in FIG. 12, the marking box 1003 of the right bird 1 on the first image in the first window 1001 is highlighted relative to the marking box 1002 of the bird 2 on the left. In this way, the user may determine that a current preview image corresponds to the bird 1.

Figure 12:
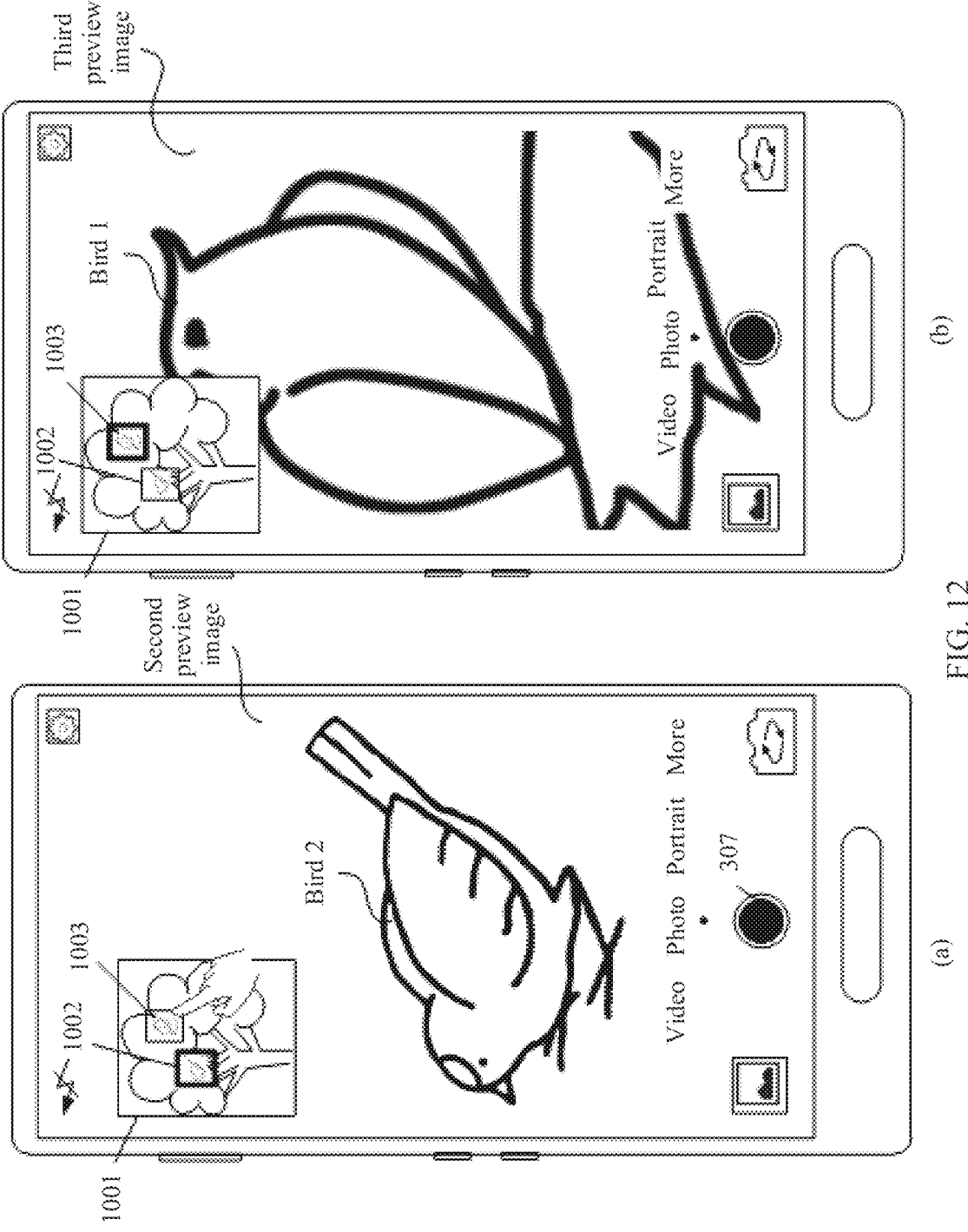

When all target shooting objects in the first window 1001 can be marked, the switching operation of the target shooting object may be an operation of tapping the marking box in the first window 1001. For example, (a) in FIG. 12 is used as an example. The current preview image corresponds to the bird 2 in the marking box 1002. When an operation of tapping the marking box 1003 in the first window 1001 by the user is detected, the third preview image, that is, (b) in FIG. 12, is displayed. The third preview image corresponds to the bird 1 in the marking box 1003. That is, switching of the target shooting object is completed by tapping the marking box in the first window 1001.

In the foregoing embodiment, only one target shooting object (that is, a bird) is displayed on the shooting interface. Optionally, a quantity of target shooting objects on the shooting interface may be further increased.

Figure 13A:
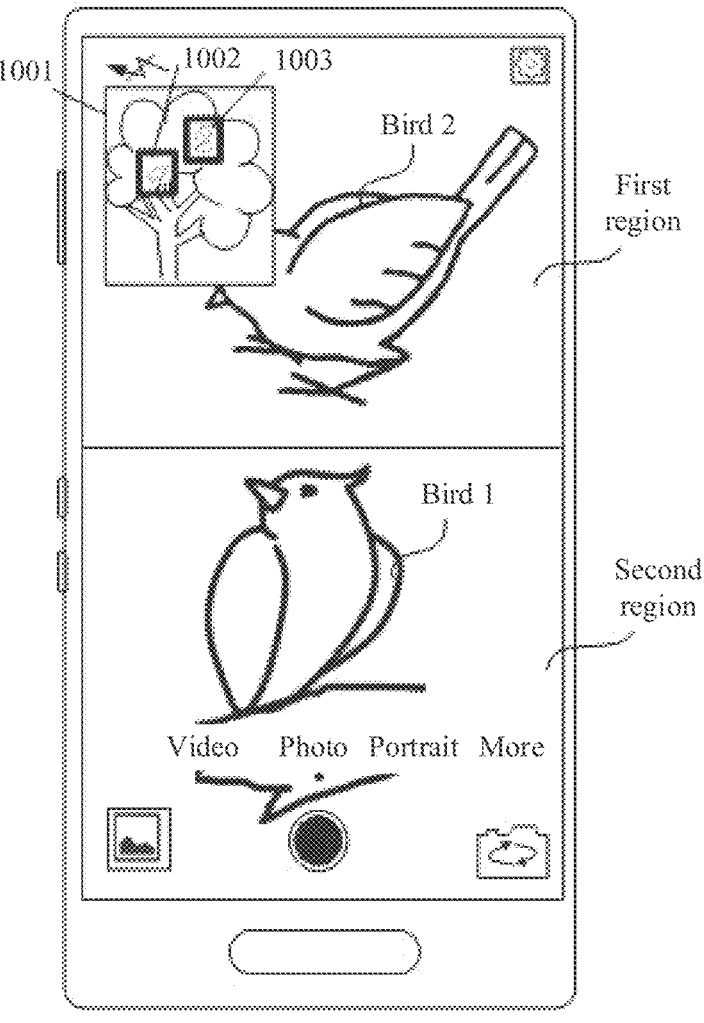
FIG. 13A and FIG. 13B are other schematic diagrams of shooting interfaces of an electronic device according to an embodiment of this application.
Figure 13B:
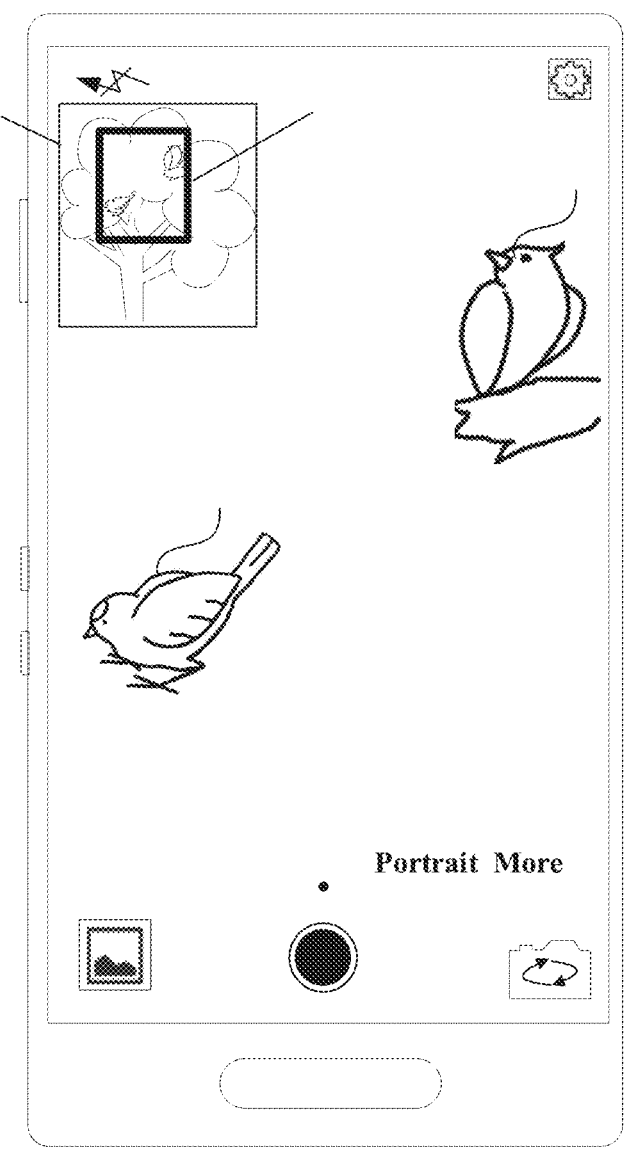

In an example, (a) in FIG. 12 is used as an example, and the second preview image corresponds to the bird 2. When an operation for increasing the quantity of target shooting objects on the shooting interface is detected, two target shooting objects, that is, the bird 1 and the bird 2, are displayed on the shooting interface. In one manner, a region 1 (the region 1 includes the bird 1) is determined based on the bird J, a region 2 (the region 2 includes the bird 2) is determined based on the bird 2, and then the shooting interface is divided into two regions (that is, split-screen display). The first region displays an image block in the region 1, and the second region displays an image block in the region 2, for example, FIG. 13A. In this case, both the two marking boxes in the first window 1001 on the shooting interface are highlighted. The first region and the second region may be two regions obtained through division from top to bottom or two regions obtained through division from left to right. This is not limited in this application. For example, in landscape shooting, division may be performed from left to right, and in portrait shooting, division may be performed from top to bottom. In another manner, different from split-screen display, a third region is determined based on the two target shooting objects, and an image block in the third region is displayed on the shooting interface. For example, the third region is a minimum region that can enclose the two target shooting objects (the bird 1 and the bird 2), and resolution of the third region matches the resolution of the preview image. In this manner, display effect after the quantity of target shooting objects is increased is shown in FIG. 13B. As shown in FIG. 13B, the first window 1001 is further displayed on the shooting interface, and a marking box 1004 is displayed in the first window 1001. The marking box 1004 encloses the bird 1 and the bird 2.

The operation for increasing the quantity of target shooting objects on the shooting interface may include the following. (a) in FIG. 12 is used an example, and the marking box 1002 is selected. When an operation of selecting the marking box 1003 in the first window 1001 is detected (for example, an operation of touching and holding the marking box 1003), it is determined that both the marking box 1002 and the marking box 1003 are selected, and then the bird 1 in the marking box 1003 is added to the shooting interface. That is, FIG. 13A or FIG. 13B is displayed. Alternatively, the operation for increasing the quantity of target shooting objects on the shooting interface may be an operation of reducing a zoom ratio, for example, a sliding operation of moving a thumb relatively closer to an index finger. Alternatively, the operation for increasing the quantity of target shooting objects on the shooting interface may be an operation for a preset button on the shooting interface. For example, the preset button is displayed on the shooting interface. When the operation for the button is detected, it is determined to increase the quantity of target shooting objects on the shooting interface. Alternatively, the operation for increasing the quantity of target shooting objects on the shooting interface may be a voice instruction used to indicate that the quantity of target shooting objects is increased.

(a) in FIG. 12 is still used as an example. When a shooting operation (for example, tapping a shooting control 307) is detected, one or two images are obtained through shooting. If there is an image, the image may be an image block in the marking box 1002, that is, an image obtained by zooming in and shooting the bird 2 on the left. If there are two images, one may be an image block in the marking box 1002, and the other may be the first image, that is, a complete image. Alternatively. (a) in FIG. 12 is still used as an example. When a shooting operation (for example, tapping the shooting control 307) is detected, a quantity of all marking boxes in the first window 1001 or a quantity of selected (or highlighted) marking boxes in all marking boxes is determined. Assuming that a determined quantity of marking boxes is N (N=2), there are N+1 images obtained through shooting. One of the images is the first image, that is, a complete image, and N images correspond to image blocks in N marking boxes.

It should be noted that there is a case in which the electronic device does not identify the target shooting object (that is, the target shooting object is not identified in S203 in FIG. 2). In this case, the electronic device may perform processing based on a general zoom shooting procedure, that is, zoom in and display an image block in the central region on the first image. For example, if the target shooting object is not identified, a shooting interface as shown in (a) in FIG. 14 may be displayed, and a preview image displayed on the shooting interface is an image block in the central region on the first image. Alternatively, when the target shooting object is not identified, the first window may be further displayed on the shooting interface. With reference to (b) in FIG. 14, a first window 1401 displays a first image, and a marking box 1402 is displayed on the first image. The marking box 1402 is used to indicate a location of the central region. When the location of the electronic device moves, a location of the marking box 1402 on the first window 1401 changes. In this way, the user may determine a location of the current preview image in the first image by using a location of the marking box 1402 in the first window 1401, and provide an indication function in a process of searching for an object that the user wants to shoot an image of. For example, when there is no object that the user wants to shoot an image of in the central region, the user determines, by using the first window 1401, that the object that the user wants to shoot an image of is in the left region of the marking box 1402 on the first image. In this way, the user can quickly find the desired shooting object by moving the electronic device leftwards, and avoid blindly searching for the object that the user wants to shoot an image of without knowing where the desired shooting object is.

Optionally, a manner of zooming in and shooting the target shooting object in the zoom shooting scene provided in this embodiment of this application is used as a first zoom shooting mode. The foregoing common zoom shooting processing manner (that is, zooming in and shooting an image block in a central region during zoom shooting) is used as a second zoom shooting mode. In this case, the electronic device may use the first zoom shooting mode or the second zoom shooting mode by default. Alternatively, the first zoom shooting mode or the second zoom shooting mode may be further determined based on a specified operation of the user. For example, a switching control is displayed on the shooting interface of the electronic device, and the switching control is used to switch between the first zoom shooting mode and the second zoom shooting mode. For another example, when an operation for increasing the zoom ratio is detected, prompt information is displayed. The prompt information is used to prompt the user to select the first zoom shooting mode or the second zoom shooting mode.

Embodiment 2

In the foregoing Embodiment 1, an electronic device automatically identifies a target shooting object on a first image, and zooms in at least one target shooting object for shooting. However, there is a case in which the target shooting object automatically identified by the electronic device is not an object that a user currently wants to shoot an image of. In this way, it is relatively difficult to shoot, by using the manner in Embodiment 1, an image of an object that the user wants to shoot an image of. In Embodiment 2, a zoom shooting mode of the electronic device may include a manual mode and an automatic mode. When the automatic mode is selected, the electronic device performs processing in a manner in Embodiment 1, that is, automatically identifies the target shooting object on the first image, and then zooms in the at least one target shooting object for shooting. When the manual mode is selected, the electronic device may not automatically identify the target shooting object on the first image, but prompts the user to manually select the target shooting object. In other words, in the automatic mode, the target shooting object is automatically identified by the electronic device, and in the manual mode, the target shooting object is manually selected by the user.

Figure 16A:
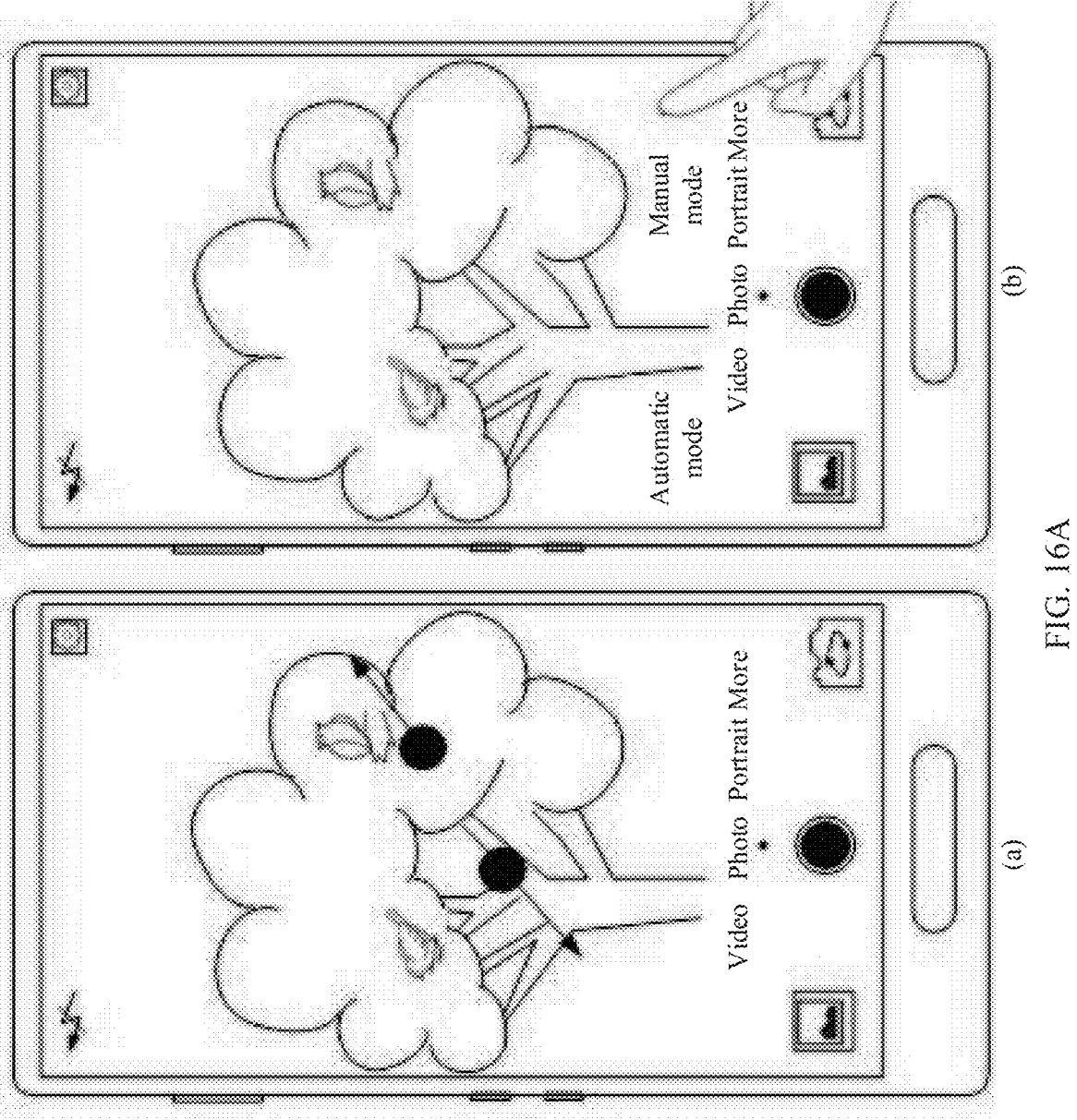
FIG. 16A and FIG. 16B are a schematic diagram of a manual mode for zoom shooting according to an embodiment of this application.
Figure 16B:
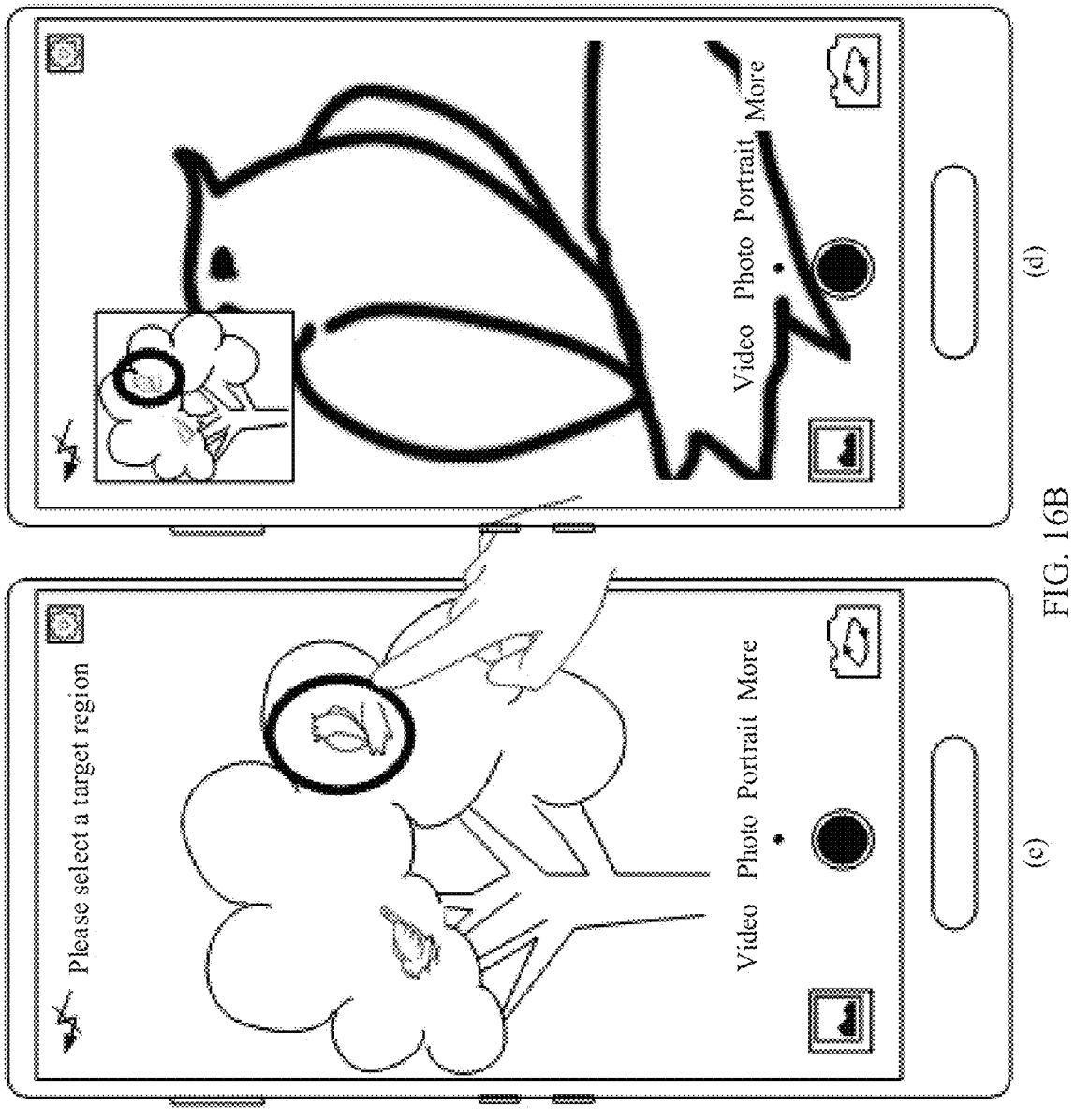

For example, FIG. 15 is a schematic flowchart of a method for displaying a preview image in a zoom shooting scene according to Embodiment 2. Compared with steps in Embodiment 1, that is, steps in FIG. 2, in FIG. 15, S202-1, that is, determining whether it is the manual mode or the automatic mode, is added between S202 and S203. For example, with reference to (a) in FIG. 16A, when an operation for increasing a zoom ratio is detected, a shooting interface as shown in (b) in FIG. 16A is displayed. A button of a manual mode and a button of the automatic mode are displayed on the shooting interface: and when it is detected that the user selects an automatic mode, S203 and S204 are performed. For S203 and S204, refer to Embodiment 1. When an operation of selecting the manual mode by the user is detected, S205 is performed to prompt the user to select a target shooting object. For example. (b) in FIG. 16A is still used as an example. After the user selects the manual mode, a shooting interface as shown in (c) in FIG. 16B is displayed, and the shooting interface displays prompt information: Please select the target shooting object. The electronic device determines the target shooting object based on an operation of the user. For example, when a circle drawing operation is detected, a shooting object in a region circled by the circle drawing operation is determined as the target shooting object, and then the shooting interface as shown in (d) in FIG. 16B is displayed. A preview image on the shooting interface is an image block in the region circled by the user by the circle drawing operation. In other words, during zoom shooting, the target shooting object manually selected by the user is zoomed in for shooting.

Figure 17:
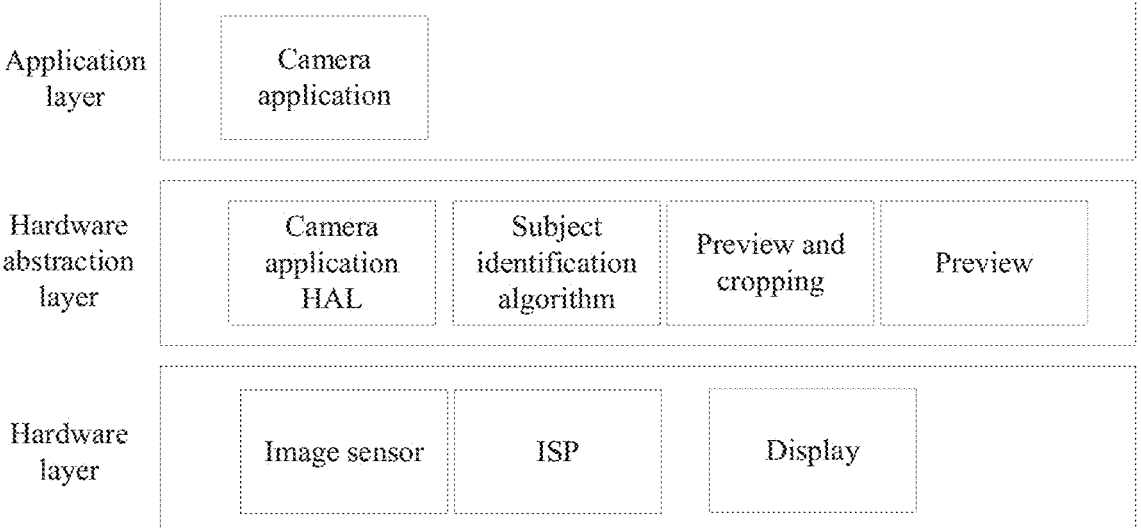
FIG. 17 is a schematic diagram of a software structure of an electronic device according to an embodiment of this application.

FIG. 17 is a block diagram of a software structure of an electronic device according to an embodiment of this application.

As shown in FIG. 17, the software structure of the electronic device may be a layered architecture. For example, software may be divided into several layers, and each layer has a clear role and responsibility. The layers communicate with each other by using a software interface. An Android system is used as an example. The Android system may include three layers: an application layer, a hardware abstraction layer (hardware abstraction layer, HAL), and a hardware layer (hardware layer) from top to bottom. It should be noted that this specification uses a three-layer Android system as an example for description. Actually, the Android system may further include more or fewer layers. For example, a kernel layer may be further included between the hardware layer and the HAL layer.

Alternatively, an application framework (framework, FWK) layer may be included between the application layer and the HAL layer. This is not limited in this application.

The application layer may include a series of application packages, such as a camera application, settings, a skin module, a user interface (user interface, UI), and a third-party application. The third-party application may include WeChat®, QQ®, Gallery, Calendar. Phone. Map, Navigation, WLAN, Bluetooth, Music, Video, Messaging, and the like. FIG. 12 shows only the camera application.

The hardware abstraction layer is used to establish an interface layer between the hardware abstraction layer and a hardware circuit, and aims to abstract hardware and provide a virtual hardware platform for an operating system, so that the hardware abstraction layer is hardware agnostic and can be transplanted on a plurality of platforms. The hardware abstraction layer includes a camera HAL (camera HAL), and is configured to implement information exchange between the camera application in the application layer and hardware in the hardware layer. The HAL layer also includes a subject identification module, a preview and cropping module, and a preview (preview) module. The subject identification module is configured to identify a target shooting object on an image (for example, an output image of an ISP) acquired by a camera, may be further configured to set a marking box to mark an identified target shooting object, and may be further configured to determine a first region based on the marking box. A process of determining the first region is described below. The preview and cropping module is configured to crop an image block in the first region from an image acquired by the camera (for example, an output image of an ISP), to serve as a preview image. The preview module is configured to send the image block obtained through cropping by the preview and cropping module to a display at the hardware layer for display.

The hardware layer may include various sensors, for example, an image sensor and an image signal processor (image signal processor, ISP), or the like. The image sensor may be a photosensitive element disposed in the camera. Light is transmitted to the photosensitive element by using a lens to form an electrical signal, and the electrical signal is transmitted to the ISP. The photosensitive element may be a charge coupled device (charge coupled device, CCD) or a complementary metal-oxide-semiconductor (complementary metal-oxide-semiconductor. CMOS) phototransistor. The photosensitive element converts an optical signal into an electrical signal, and then transmits the electrical signal to the ISP. The ISP converts the electrical signal into an image (that is, a digital image signal) visible to a naked eye. The ISP may further perform algorithm optimization on noise, brightness, and complexion of the image. The ISP may further optimize parameters such as exposure and color temperature of a shooting scene. For example, the ISP outputs the digital image signal to a DSP for processing. The DSP converts the digital image signal into an image signal in a standard format such as RGB or YUV. In some embodiments, the ISP may be disposed in the camera.

With reference to a software architecture shown in FIG. 17, the following describes a method for displaying a preview image in a zoom shooting scene provided in an embodiment of this application.

Figure 18A:
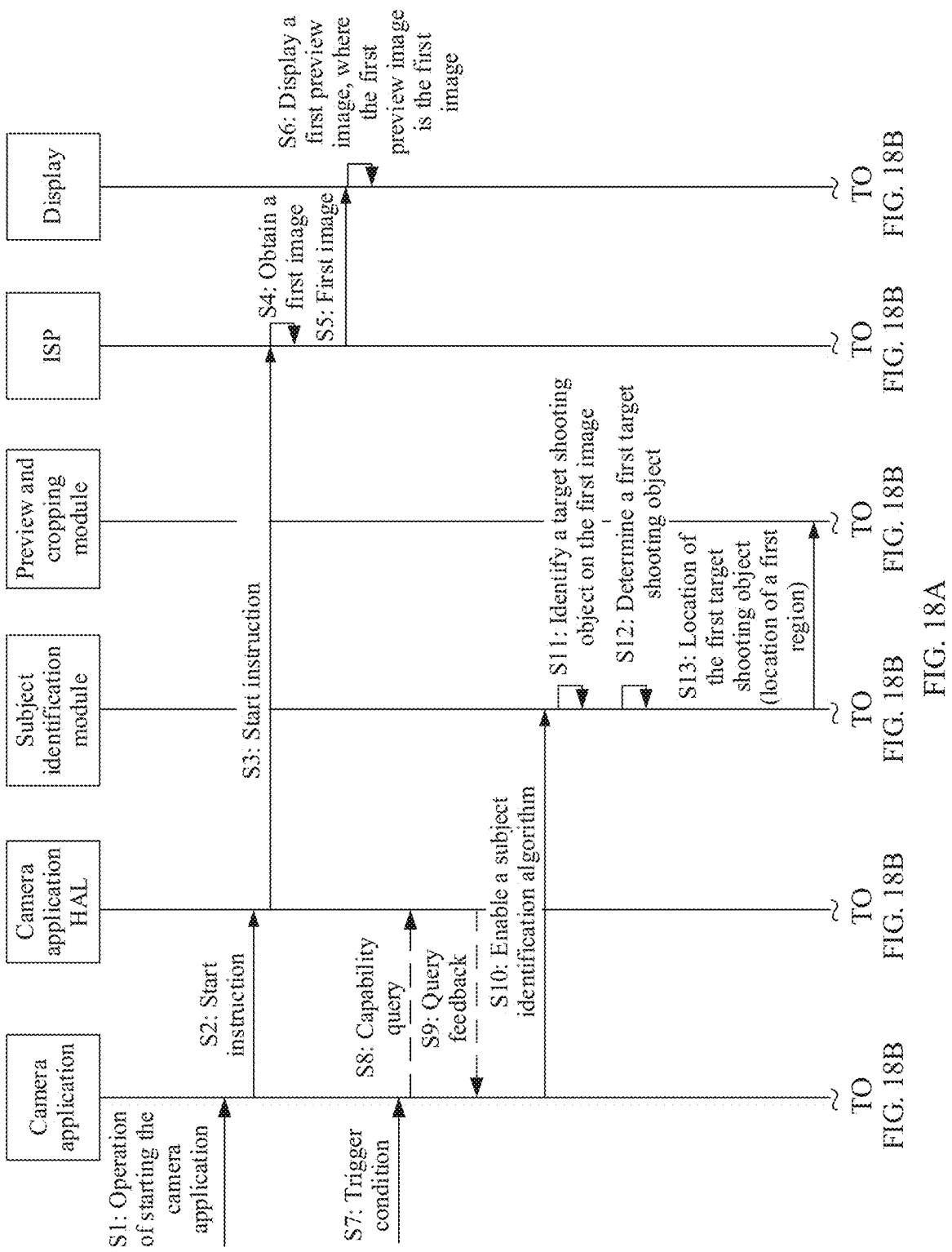
FIG. 18A and FIG. 18B are a schematic diagram of information exchange between different modules in an electronic device according to an embodiment of this applica-tion.
Figure 18B:
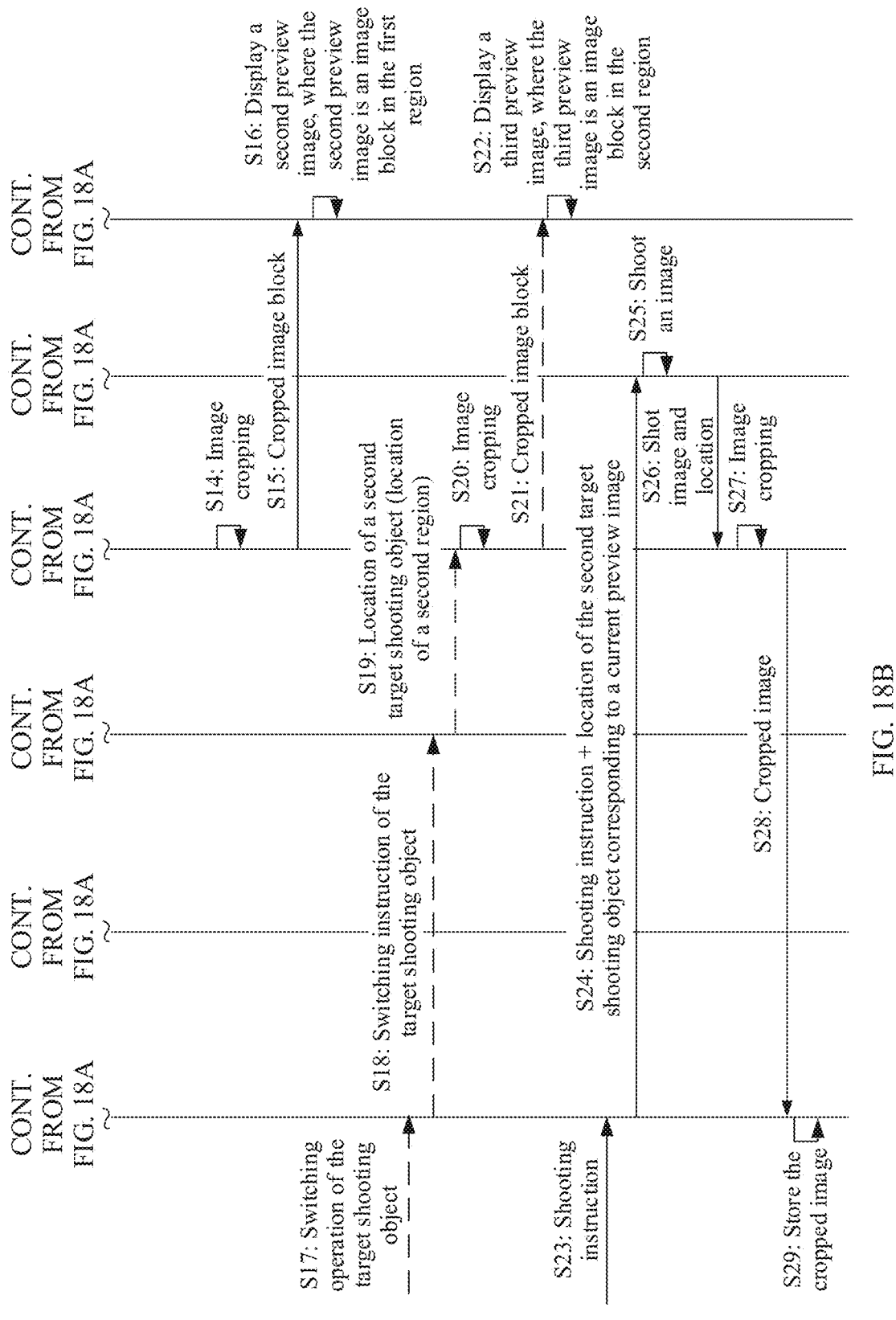

FIG. 18A and FIG. 18B are schematic diagrams of information exchange between different modules in an electronic device according to an embodiment of this application. As shown in FIG. 18A and FIG. 18B, the procedure includes the following steps.

S1: A camera application detects a start instruction, where the start instruction instructs to start the camera application.

S2: The camera application sends the start instruction to a camera HAL.

S3: The camera HAL sends the start instruction to an ISP.

S4: The ISP obtains a first image.

S5: The ISP sends the first image to a display.

S6: The display displays a first preview image, where the first preview image is the first image.

S7: The camera application detects a trigger condition.

S8: The camera application sends a capability query request to the camera HAL, where the capability query request is used to request to query whether the electronic device has a function of a first auxiliary preview mode.

S9: The camera HAL sends a query feedback to the camera application.

Optionally: S8 to S9 are optional steps, and may be performed or may not be performed.

S10: The camera application sends, to a subject identification module, an enabling instruction for enabling a subject identification algorithm.

S11: The subject identification module identifies a target shooting object on the first image.

S12: The subject identification module determines a first target shooting object.

S13: The subject identification module sends a location of the first target shooting object to a preview and cropping module. For example, a first region is determined based on the first target shooting object, and then a location of the first region is sent to the preview and cropping module.

S14: The preview and cropping module performs image cropping.

S15: The preview and cropping module sends a cropped image block to the display.

S16: Display a second preview image on the display, where the second preview image is an image block in the first region on the first image.

S17: The camera application detects a switching operation of the target shooting object.

S18: The camera application sends the switching instruction of the target shooting object to the subject identification module.

S19: The subject identification module switches the first target shooting object to a second target shooting object, and sends a location of the second target shooting object to the preview and cropping module. For example, a second region is determined based on the second target shooting object, and then a location of the second region is sent to the preview and cropping module.

S20: The preview and cropping module performs image cropping.

S21: The preview and cropping module sends the cropped image block to the display.

S22: Display a third preview image on the display, where the third preview image is an image block in the second region on the first image.

S17 to S22 may not be performed. Therefore, dashed lines are used in FIG. 18B.

S23: The camera application detects a shooting instruction.

S24: The camera application sends the shooting instruction and a location of the target shooting object corresponding to a current preview image to the ISP.

For example, when the shooting instruction is detected when the second preview image is displayed on the shooting interface, the current preview image is the second preview image, and the corresponding target shooting object is the first target shooting object. In this case, the location of the first region may be sent. When the third preview image is displayed on the shooting interface, if the shooting instruction is detected, the current preview image is the third preview image, and a corresponding target shooting object is the second target shooting object. That is, a location of the second region may be sent.

S25: The ISP shoots an image.

S26: The ISP sends the shot image and the location to the preview and cropping module.

S27: The preview and cropping module crops the shot image to obtain a cropped image.

If the location of the first region is received, an image block in the first region is cropped and used as a shot image. If the location of the second region is received, an image block in the second region is cropped and used as a shot image.

S28: The preview and cropping module sends the cropped image to the camera application.

S29: The camera application stores the cropped image.

Based on a same concept. FIG. 19 is a schematic flowchart of a method for displaying a preview image in a zoom shooting scene according to an embodiment of this application. The method is applicable to an electronic device, such as a mobile phone or a tablet computer. The procedure includes the following steps:

S1901: Start a camera application in the electronic device, where a camera on the electronic device acquires a first image.

For an implementation principle of S1901, refer to descriptions of S201 in FIG. 2. Details are not described herein again.

S1902: Identify, in a zoom shooting mode, a target shooting object on the first image.

In a possible implementation, when detecting a trigger condition (for example, an operation for increasing a zoom ratio), the electronic device identifies the target shooting object on the first image. This method helps reduce power consumption.

In another possible implementation, after acquiring the first image, the camera of the electronic device may identify the target shooting object on the first image, and when a trigger condition (for example, an operation for increasing the zoom ratio) is detected, S1903 is performed.

S1903: Display a first preview image, where the first preview image is a preview image corresponding to at least one target shooting object on the first image.

The at least one target shooting object may be a shooting object that occupies a largest or smallest region on the first image, or the at least one target shooting object may be a shooting object close to a central region or an edge region in the first image: or the at least one target shooting object may be a shooting object that is in the first image and that a user is interested in (for a principle of determining the object that the user is interested in, refer to the foregoing descriptions), or the at least one target shooting object may be a target shooting object specified by the user. The foregoing describes several manners of determining the at least one target shooting object. This embodiment of this application is not limited to the foregoing manners, and the at least one target shooting object may be determined in another manner.

A size of the at least one target shooting object on the first preview image is greater than a size of the at least one target shooting object on the first image. It may be understood that the at least one target shooting object on the first image is zoomed in for display. For example, with reference to FIG. 8, the first image is an image including a tree and two birds. During zoom shooting, the electronic device displays a preview image corresponding to a bird 2 on the first image, that is, displays a magnified bird 2.

S1904: Display a first window while displaying the first preview image, where the first window displays the first image and a first marker, and the first marker is used to mark the at least one target shooting object on the first image.

For example, with reference to (a) in FIG. 10, when the magnified bird 2 is displayed, the bird 2 is marked in the first window. The user may determine, by using the first marker in the first window, a specific target shooting object in the first image that corresponds to the current preview image (that is, the first preview image), and user experience is relatively good.

S1904 is an optional step, and may be performed or may not be performed. Therefore, S1904 is indicated by using dashed lines in the figure.

For example, the first window further displays a second marker. The second marker is used to mark another target shooting object other than the at least one target shooting object on the first image, and the first marker is different from the second marker.

For example, with reference to (a) in FIG. 12, when the magnified bird 2 is displayed, a marking box 1002 and a marking box 1003 are displayed in the first window 1101. The marking box 1002 is used to mark the bird 2 on the first image, the marking box 1003 is used to mark the bird 1 on the first image, and the marking box 1002 is different from the marking box 1003 (for example, the marking box 1002 is bold, and the marking box 1003 is not bold). In this way, the user can distinguish a specific target shooting object on the first image corresponding to the current preview image (that is, the first preview image).

In some embodiments, the first image includes the first target shooting object and the second target shooting object, and the first preview image is a preview image corresponding to the first target shooting object. When a switching operation of the target shooting object is detected, the second preview image is displayed, and the second preview image is a preview image corresponding to the second target shooting object. A size of the second target shooting object on the second preview image is greater than a size of the second target shooting object on the first image.

For example, with reference to FIG. 8 and FIG. 9, the electronic device in FIG. 8 displays the magnified bird 2. When detecting the target shooting object switching operation, the electronic device displays a magnified bird 1, that is, FIG. 9. In other words, when an image of the first target shooting object is originally zoomed in and shot, an image of the second target shooting object is zoomed in and shot by using the switching operation of the target shooting object, so that the user does not need to move the electronic device to search for the target shooting object, and an operation is convenient.

Optionally, when the electronic device displays the second preview image, the second marker is displayed in the first window, and the second marker is used to mark the second target shooting object on the first image. Optionally, when the first window displays the second marker, display of the first marker (used to mark the first target shooting object on the first image) may be canceled or the second marker may be displayed differently from the first marker.

For example, with reference to (a) in FIG. 10, when the magnified bird 2 is displayed, the bird 2 in the first window is marked (for example, marked by using a marking box): and when the magnified bird 1 is displayed, the bird 1 in the first window is marked (for example, marked by using another marking box), and the bird 2 is not marked, as shown in (b) in FIG. 10.

For another example, with reference to (a) in FIG. 12, when the magnified bird 2 is displayed, the marking box 1002 used to mark the bird 2 in the first window is highlighted relative to the marking box 1003 used to mark the bird 1; and when the magnified bird 1 is displayed, the marking box 1003 in the first window is highlighted relative to the marking box 1002, as shown in (b) in FIG. 12.

In some other embodiments, when an operation of adding a target shooting object to a preview image is detected, the third preview image is displayed. The third preview image is a preview image corresponding to the first target shooting object and the second target shooting object, and sizes of the first target shooting object and the second target shooting object on the third preview image are greater than sizes of the first target shooting object and the second target shooting object on the first image.

For example, with reference to FIG. 13B, the electronic device displays the bird 1 and the bird 2 that are zoomed in under an operation of adding the target shooting object to the preview image.

Alternatively, when an operation for increasing a quantity of target shooting objects in the preview image is detected, the first preview image is displayed on the first region of the display of the electronic device, and a fourth preview image is displayed on the second region. The fourth preview image is a preview image corresponding to the second target shooting object, and a size of the second target shooting object on the fourth preview image is greater than a size of the second target shooting object on the first image.

For example, with reference to FIG. 13A, the electronic device performs split-screen display under an operation of adding a target shooting object to the preview image. The first region displays the magnified bird 2, and the second region displays the magnified bird 1.

There is a case in which the target shooting object on the first image is not identified. In this case, the electronic device displays a fifth preview image. The fifth preview image is a preview image corresponding to an image block in a central region on the first image. For example, with reference to (b) in FIG. 14, the electronic device zooms in and displays an image block in a central region on the first image.

In some embodiments, a shooting instruction is detected: and the first image and a second image are shot in response to the shooting instruction. The second image is a shot image corresponding to the first preview image. In other words, during zoom shooting, if a shooting button is tapped, a complete image (that is, the first image) is shot, and a magnified image (that is, the second image) of at least one target shooting object is further shot. This facilitates comparison by the user, and experience is relatively good.

Based on a same concept, FIG. 20 shows an electronic device 2000 according to this application. The electronic device 2000 may be the foregoing mobile phone. As shown in FIG. 20, the electronic device 2000 may include one or more processors 2001, one or more memories 2002, a communication interface 2003, and one or more computer programs 2004. The foregoing components may be connected by using one or more communication buses 2005. The one or more computer programs 2004 are stored in the one or more memories 2002 and are configured to be executed by the one or more processors 2001. The one or more computer programs 2004 include instructions, and the instructions may be used to perform the steps in the corresponding embodiments. The communication interface 2003 is configured to implement communication with another device. For example, the communication interface may be a transceiver.

In embodiments provided in this application, the method provided in embodiments of this application is described from the perspective in which the electronic device (for example, the mobile phone) is used as an execution body. To implement the functions in the method provided in the foregoing embodiments of this application, the electronic device may include a hardware structure and/or a software module, to implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

According to the context, the term "when" or "after" used in the foregoing embodiments may be interpreted as a meaning of "if", "following", "in response to determining", or "in response to detecting" Similarly, according to the context, the phrase "when it is determined that" or "if (a stated condition or event) is detected" may be interpreted as a meaning of "when it is determined that", "in response to determining", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments". "in some other embodiments", and "in other embodiments" that appear at different places in this specification do not necessarily refer to a same embodiment. Instead, the statements mean "one or more but not all of embodiments", unless otherwise specifically emphasized in another manner. The terms "include", "comprise", and "have", and variants thereof all mean "include but are not limited to", unless otherwise specifically emphasized in another manner.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid State Disk (SSD)), or the like. In a case in which no conflict occurs, the solutions in the foregoing embodiments may be combined for use.

It should be noted that a part of this patent application document includes copyright-protected content. The copyright owner reserves the copyright except copies are made for the patent documents or the recorded content of the patent documents in the Intellectual Property Administration.

What is claimed is:

1. A method, comprising:
starting a camera application of an electronic device;
acquiring, by a camera of the electronic device, a first image;
identifying, in a zoom shooting mode of the camera application, a first target shooting object and a second target shooting object in the first image;
displaying, in response to identifying the first target shooting object and in a graphical user interface, a first preview image comprising the first target shooting object, wherein a first size of the first target shooting object in the first preview image is greater than a second size of the first target shooting object in the first image;
displaying, in response to identifying the second target shooting object and in the graphical user interface, a second preview image comprising the second target shooting object, wherein a third size of the second target shooting object in the second preview image is greater than a fourth size of the second target shooting object in the first image; and
displaying, in the graphical user interface, a first window displaying the first image, a first marker marking the first target shooting object in the first image, and a second marker marking the second target shooting object in the first image,
wherein the first preview image, the second preview image, and the first window are displayed in the graphical user interface at the same time.

2. The method of claim 1, wherein the first image comprises the first target shooting object and the second target shooting object, wherein the method further comprises detecting a target shooting object switching operation, and wherein displaying the second preview image comprises displaying, in response to detecting the target shooting object switching operation, the second preview image.

3. The method of claim 1, wherein the first image comprises the first target shooting object and the second target shooting object, and wherein the method further comprises:
detecting an operation for increasing a quantity of target shooting objects in the first preview image; and
in response to detecting the operation:
displaying the first preview image in a first region of a display of the electronic device; and
displaying the second preview image in a second region of the display.

4. The method of claim 1, further comprising:

detecting a shooting instruction; and shooting, in response to detecting the shooting instruction, the first image and a second image, wherein the second image corresponds to the first preview image.

5. The method of claim 1, further comprising:

detecting a window hiding operation;

hiding, in response to detecting the window hiding operation, the first window;

detecting a window call-out operation; and displaying, in response to detecting the window call-out operation, the first window.

6. The method of claim 1, wherein displaying the first preview image and displaying the second preview image comprise displaying the first preview image in a first region of a display of the electronic device and displaying the second preview image in a second region of the display of the electronic device.

7. The method of claim 6, wherein the first region of the display of the electronic device comprises a top portion of the display of the electronic device, and wherein the second region of the display of the electronic device comprises a bottom portion of the display of the electronic device.

8. The method of claim 6, wherein the first region of the display of the electronic device comprises a left portion of the display of the electronic device, and wherein the second region of the display of the electronic device comprises a right portion of the display of the electronic device.

9. The method of claim 1, wherein the first marker comprises a first box surrounding and highlighting the first target shooting object in the first image, and wherein the second marker comprises a second box surrounding and highlighting the second target shooting object in the first image.

10. The method of claim 1, wherein the first preview image and the second preview image are displayed in separate areas of the graphical user interface, and wherein the first window is superimposed on one of the first preview image or the second preview image.

11. The method of claim 1, wherein the first preview image comprises a zoomed-in image of the first target shooting object in the first image, and wherein the second preview image comprises a zoomed-in image of the second target shooting object in the first image.

12. The method of claim 1, wherein the first image comprises content displayed in the first preview image, content displayed in the second preview image, and additional content not displayed in the first preview image and the second preview image.

13. The method of claim 1, wherein the first image, the first preview image, and the second preview image comprise a same resolution.

14. An apparatus, comprising:

a memory configured to store instructions; and one or more processors coupled to the memory and configured to execute the instructions to:

start a camera application of the apparatus;

acquire, by a camera of the apparatus, a first image;

identify, in a zoom shooting mode of the camera application, a first target shooting object and a second target shooting object in the first image;

display, in response to identifying the first target shooting object and in a graphical user interface, a first preview image comprising the first target shooting object, wherein a first size of the first target shooting object in the first preview image is greater than a second size of the first target shooting object in the first image;

display, in response to identifying the second target shooting object and in the graphical user interface, a second preview image comprising the second target shooting object, wherein a third size of the second target shooting object in the second preview image is greater than a fourth size of the second target shooting object in the first image; and display, in the graphical user interface, a first window displaying the first image, a first marker marking the first target shooting object in the first image, and a second marker marking the second target shooting object in the first image, wherein the first preview image, the second preview image, and the first window are displayed in the graphical user interface at the same time.

15. The apparatus of claim 14, wherein the one or more processors are further configured to execute the instructions to:

detect a window hiding operation;

hide, in response to detecting the window hiding operation, the first window;

detect a window call-out operation; and display, in response to detecting the window call-out operation, the first window.

16. The apparatus of claim 14, wherein the first image comprises the first target shooting object and the second target shooting object, and wherein the one or more processors are further configured to execute the instructions to:

detect a target shooting object switching operation; and display, in response to detecting the target shooting object switching operation, the second preview image.

17. The apparatus of claim 14, wherein the first image comprises the first target shooting object and the second target shooting object, and wherein the one or more processors are further configured to execute the instructions to:

detect an operation for increasing a quantity of target shooting objects in the first preview image; and in response to detecting the operation:

display the first preview image in a first region of a display of the apparatus; and display the second preview image in a second region of the display.

18. The apparatus of claim 14, wherein the one or more processors are further configured to execute the instructions to display the first preview image and display the second preview image by displaying the first preview image in a first region of a display of the apparatus and displaying the second preview image in a second region of the display of the apparatus.

19. The apparatus of claim 14, wherein the one or more processors are further configured to execute the instructions to display the first preview image and display the second preview image by:

receiving, while displaying the first preview image, a switching operation; and displaying, in response to receiving the switching operation, the second preview image instead of the first preview image.

20. A computer program product comprising instructions stored on a non-transitory computer-readable medium that, when executed by one or more processors, cause an apparatus to:

start a camera application of the apparatus;

acquire, by a camera of the apparatus, a first image;

identify, in a zoom shooting mode of the camera application, a first target shooting object and a second target shooting object in the first image;

display, in response to identifying the first target shooting object and in a graphical user interface, a first preview image comprising the first target shooting object, wherein a first size of the first target shooting object in the first preview image is greater than a second size of the first target shooting object in the first image;

display, in response to identifying the second target shooting object and in the graphical user interface, a second preview image comprising the second target shooting object, wherein a third size of the second target shooting object in the second preview image is greater than a fourth size of the second target shooting object in the first image; and display, in the graphical user interface, a first window displaying the first image, a first marker marking the first target shooting object in the first image, and a second marker marking the second target shooting object in the first image, wherein the first preview image, the second preview image, and the first window are displayed in the graphical user interface at the same time.

* * * * *